US011778935B2

(12) United States Patent
Johnson et al.

(10) Patent No.: US 11,778,935 B2
(45) Date of Patent: Oct. 10, 2023

(54) CONTROLLING OPERATING ENVELOPE FOR OFF-ROAD EQUIPMENT BASED ON A DIGITAL FENCE

(71) Applicant: Deere & Company, Moline, IL (US)

(72) Inventors: David August Johnson, Durham, NC (US); Curtis A. Maeder, Johnston, IA (US); Jeffrey M. Tott, New Hartford, IA (US); Megan L. Leininger, Ankeny, IA (US)

(73) Assignee: Deere & Company, Moline, IL (US)

( * ) Notice: Subject to any disclaimer, the term of this patent is extended or adjusted under 35 U.S.C. 154(b) by 206 days.

(21) Appl. No.: 17/473,215

(22) Filed: Sep. 13, 2021

(65) Prior Publication Data

US 2023/0085133 A1    Mar. 16, 2023

(51) Int. Cl.
*A01B 69/00* (2006.01)
*E02F 9/26* (2006.01)
*G01C 15/00* (2006.01)
*H04W 4/021* (2018.01)

(52) U.S. Cl.
CPC ............ *A01B 69/007* (2013.01); *E02F 9/261* (2013.01); *E02F 9/264* (2013.01); *G01C 15/002* (2013.01); *H04W 4/021* (2013.01)

(58) Field of Classification Search
CPC ........ A01B 69/007; E02F 9/261; E02F 9/264; G01C 15/002; H04W 4/021; G05D 1/0274; G05D 1/0278; G05D 2201/0201
See application file for complete search history.

(56) References Cited

U.S. PATENT DOCUMENTS

| | | | |
|---|---|---|---|
| 6,393,362 B1 | 5/2002 | Burns | |
| 8,190,364 B2 | 5/2012 | Rekow | |
| 9,788,156 B1 | 10/2017 | Anderson et al. | |
| 9,838,843 B1 | 12/2017 | Bajaj et al. | |
| 10,180,328 B2 | 1/2019 | Matthews | |
| 10,568,258 B2 | 2/2020 | Wahigren | |
| 10,732,628 B2 | 8/2020 | Sakaguchi et al. | |
| 10,809,741 B2 | 10/2020 | Hille et al. | |
| 10,858,053 B2 | 12/2020 | Bean et al. | |
| 2007/0115101 A1 | 5/2007 | Creekbaum et al. | |
| 2008/0154712 A1 | 6/2008 | Wellman | |

(Continued)

FOREIGN PATENT DOCUMENTS

| | | |
|---|---|---|
| EP | 3647735 A1 | 5/2020 |
| EP | 3695699 A1 | 8/2020 |
| GB | 2546869 A1 | 8/2017 |

OTHER PUBLICATIONS

Extended European Search Report and Written Opinion issued in European Patent Application No. 22189555.0, dated Feb. 9, 2023, in 09 pages.

(Continued)

*Primary Examiner* — An T Nguyen
(74) *Attorney, Agent, or Firm* — Joseph R. Kelly; Kelly, Holt & Christenson PLLC

(57) ABSTRACT

A digital fence of a work area is generated and loaded into a machine control system that controls an off-road machine. The machine control system detects whether the off-road machine is within a threshold distance of the digital fence and automatically controls operating parameters of the off-road machine when the off-road machine is within a threshold distance of the digital fence.

20 Claims, 17 Drawing Sheets

(56) References Cited

U.S. PATENT DOCUMENTS

| | | | |
|---|---|---|---|
| 2009/0043462 A1* | 2/2009 | Stratton | E02F 9/26 |
| | | | 701/50 |
| 2013/0144770 A1 | 6/2013 | Boling et al. | |
| 2014/0032058 A1* | 1/2014 | Stratton | E02F 9/261 |
| | | | 701/50 |
| 2016/0282868 A1* | 9/2016 | Yamamura | G05D 1/0274 |
| 2018/0373256 A1 | 12/2018 | Runde et al. | |
| 2019/0265714 A1* | 8/2019 | Ball | G05D 1/0221 |
| 2020/0071908 A1* | 3/2020 | Cherney | B60W 10/18 |
| 2020/0189582 A1 | 6/2020 | Fukushige et al. | |
| 2020/0356088 A1 | 11/2020 | Schlacks, IV et al. | |
| 2021/0405644 A1* | 12/2021 | Berridge | A01B 69/008 |

OTHER PUBLICATIONS

Alonzo Kelly et al., "Rough Terrain Autonomous Mobility", 1998, 34 pages.

* cited by examiner

CONTROLLING OPERATING ENVELOPE FOR OFF-ROAD EQUIPMENT BASED ON A DIGITAL FENCE

FIELD OF THE DESCRIPTION

The present description deals with off-road equipment. More specifically, the present description deals with controlling operational parameters of the off-road equipment based upon a digital fence.

BACKGROUND

There are a wide variety of different types of off-road equipment. Such equipment can include agricultural equipment, construction equipment, forestry equipment, turf management equipment, among other equipment.

Such off-road equipment often operates in a predefined area or worksite where the equipment is not to deviate outside of the peripheral boundaries, or other boundaries, of that worksite. For instance, agricultural equipment often operates within the boundaries of a field, and should not deviate outside of those boundaries.

Also, such agricultural equipment often includes a towing vehicle and a towed implement. The towed implement often does not follow a predictable path behind the towing vehicle. Therefore, it can be difficult for such agricultural equipment to operate close to a boundary or within tight areas of the worksite, such as field corners.

The discussion above is merely provided for general background information and is not intended to be used as an aid in determining the scope of the claimed subject matter.

SUMMARY

A digital fence of a work area is generated and loaded into a machine control system that controls an off-road machine. The machine control system detects whether the off-road machine is within a threshold distance of the digital fence and automatically controls operating parameters of the off-road machine when the off-road machine is within a threshold distance of the digital fence.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, off-road equipment often operates within a worksite that has a bounded area and is not supposed to cross the boundaries of that area. For example, agricultural equipment operates in a field and should not operate outside of the boundaries of the field. This can be difficult for a number of different reasons. For instance, it can be difficult for an operator to accurately gauge the precise dimensions of the equipment to thus ensure that it does not cross a field boundary. Similarly, when towing a towed implement, it may be that the towed implement does not follow a predictable path behind the towing vehicle, so it can be difficult to ensure that the implement does not cross the boundary.

This can lead to significant inefficiencies. For instance, because an operator may not be able to accurately gauge the precise dimensions of the equipment, or know the precise path that a towed implement will follow, the operator often slows down when the equipment is near a boundary. The reduction in speed allows the operator to more precisely control the equipment so that it does not cross the field boundary. Also, an operator may maintain an unnecessarily large distance from the boundary to ensure that the equipment will not cross the boundary. Both of these (the reduction in speed and staying a relatively large distance from the boundary) lead to inefficiencies in that it may take longer for the equipment to perform the desired operation and/or the equipment may waste a portion of the field by staying too far away from the boundary.

The present description thus proceeds with respect to a system that automatically senses the location of the equipment relative to the boundary and also considers an equipment model that models the dimensions and behavior of the equipment. The location of the equipment relative to the boundary and the equipment model are used to limit the operating envelop (e.g., operating parameters) of the equipment, such as speed, heading, steering angle, etc. to reduce the likelihood that the equipment will cross the boundary. In this way, an operator or an automated system can operate at higher speeds and at locations closer to the boundary, knowing that the system will preclude the operator or automated system from controlling the equipment in a way where it crosses the boundary.

Figure 1:
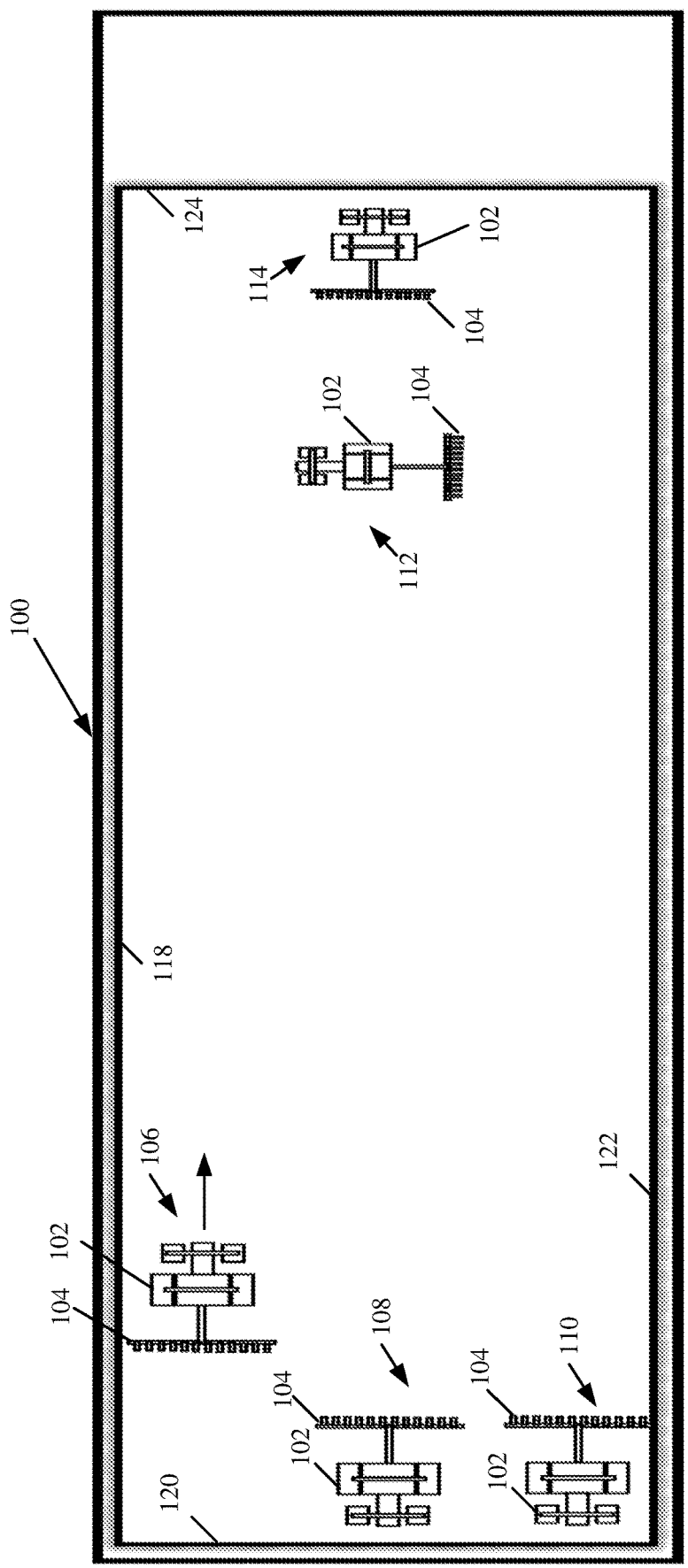
FIG. 1 is a pictorial illustration of a field showing an agricultural vehicle in a plurality of different positions within the field.

FIG. 1 is a pictorial illustration of a worksite, or field 100 with off-road equipment deployed at various locations in the field. In the example shown in FIG. 1, the off-road equipment is illustrated as a tractor 102 that is pulling a tillage implement 104. The tractor 102 and tillage implement 104 are shown at a plurality of different locations 106, 108, 110, 112, and 114 within the field 100. When the equipment is at location 106, it can be seen that the equipment is traveling in the direction illustrated by arrow 116, and is closely adjacent a boundary 118 of field 100. In such a location, the operator of tractor 102 may go relatively slowly or provide a relatively large buffer from boundary 118 so that neither tractor 102 nor the towed implement 104 cross the boundary 118. When in location 108, the tractor 102 is approaching a different boundary 120 of field 100. Therefore, the operator of tractor 102 may be going relatively slowly so as not to accidently cross the boundary 120. When in location 110, the tractor 102 and implement 104 are not only close to boundary 120, but they are also close to boundary 122 of field 100. In such a location, the operator of tractor 102 may also control tractor 102 to go slowly and maintain a relatively large buffer from the boundaries 120 and 122 of field 100. When in location 112, however, the equipment is not close to any of the boundaries of field 100. Therefore, the operator 102 may operate the equipment at a relatively high rate of speed. When in location 114, again the tractor 102 is approaching a boundary 124 of field 100 so that the operator may operate a low speed and maintain a buffer distance from boundary 124.

Figure 2:
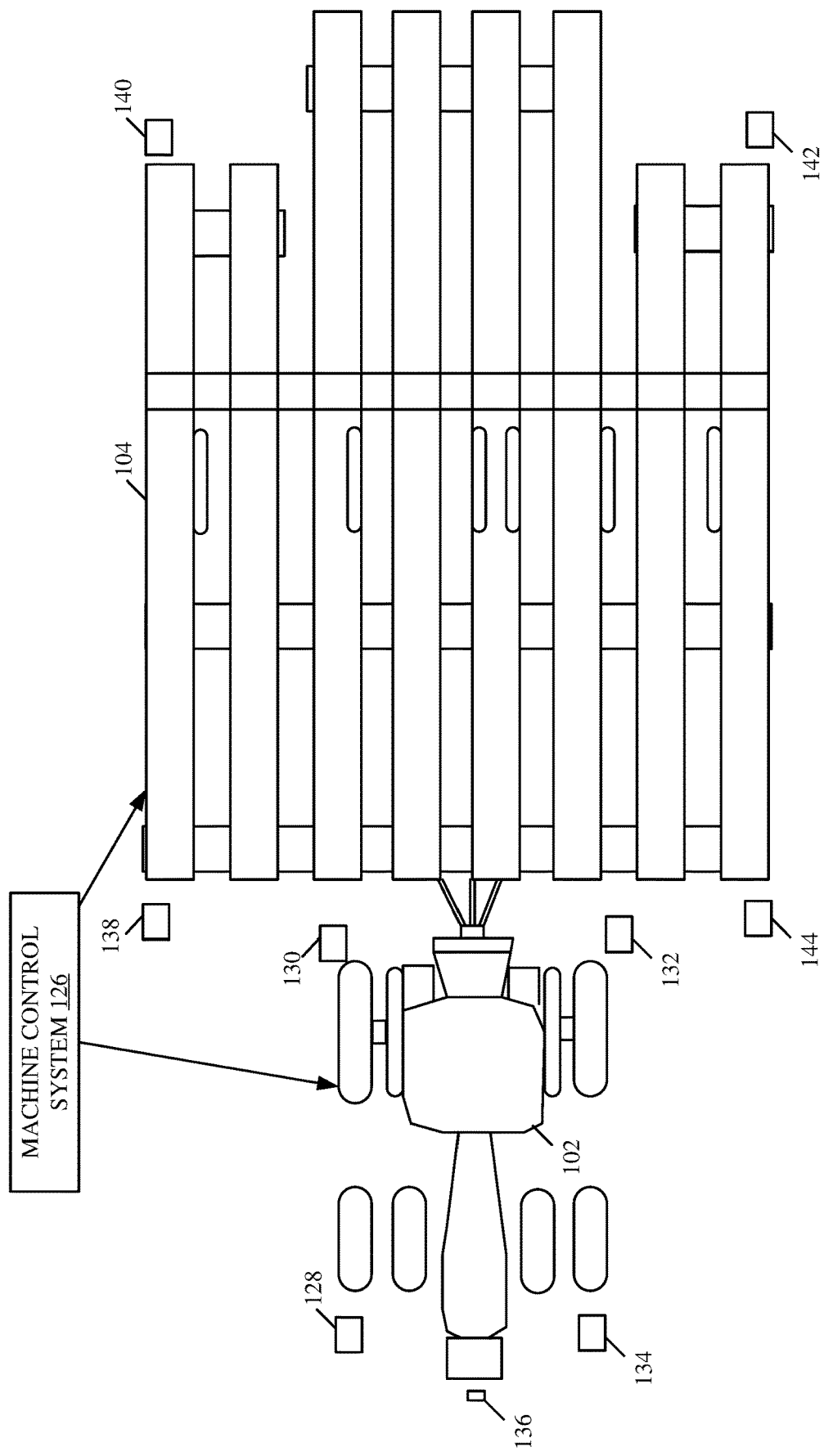
FIG. 2 is a pictorial illustration of agricultural equipment with collision points identified.

FIG. 2 shows a tractor 102 towing a tillage implement 104. FIG. 2 also shows, in one example, either the tractor 102 or the tillage implement 104, or both, have a machine control system 126. Machine control system 126 automatically identifies the potential collision points for tractor 102 and towed implement 104 and monitors the location of those collision points relative to the boundaries of the field in which it is operating (e.g., field 100). In the example shown in FIG. 2, machine control system 126 thus identifies the collision points on tractor 102 as collision points 128, 130, 132, 134, and 136. Collision points 128-136 correspond to the points on the furthest edges or corners of the periphery of tractor 102. Similarly, machine control system 126 identifies the collision points for towed implement 104 as collision points 138, 140, 142, and 144. Again, collision points 138-144 are points on the edges of the periphery of towed implement 104.

Machine control system 126 illustratively monitors the location of tractor 102 and towed implement 104 relative to the boundaries of field 100. When the location of tractor 102 or towed implement 104 are within a threshold distance of any of the boundaries, then machine control system 126 limits the operating envelope of machine 102 and/or towed implement 104 to ensure that none of the collision points 128-144 will cross the boundary of field 102. For instance, machine control system 126 can limit the speed, the heading, and/or the turn angle of tractor 102. Also, where towed implement 104 has a steerable axle, machine control system 126 may generate steering control signals to control the steering of the steerable axle to ensure that none of the collision points on towed implement 104 cross the boundary of field 100.

Figure 3:
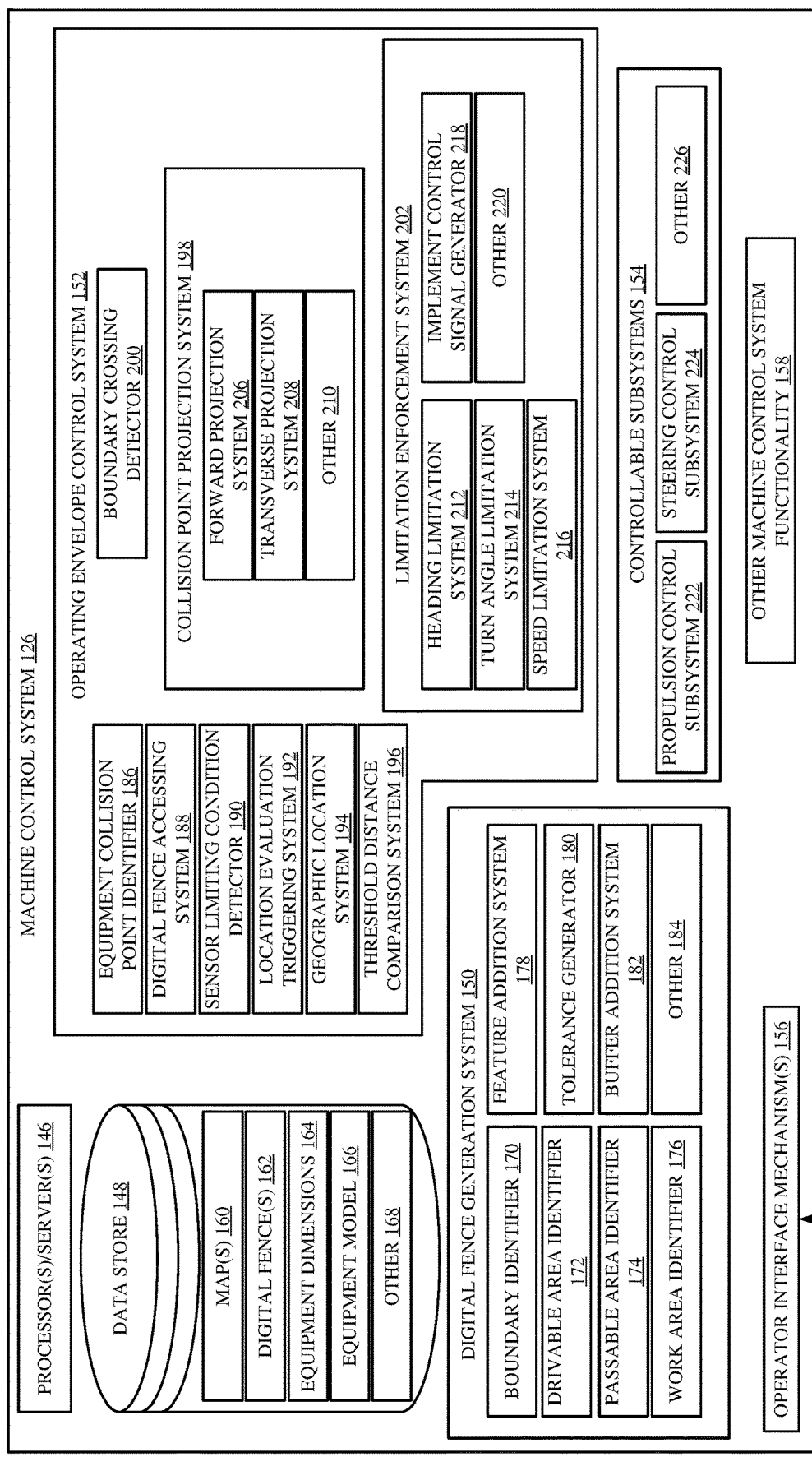
FIG. 3 is a block diagram showing one example of a machine control system.

FIG. 3 shows one example of machine control system 126 in more detail. In the example shown in FIG. 3, machine control system 126 includes one or more processors or servers 146, data store 148, digital fence generation system 150, operating envelope control system 152, controllable subsystems 154, operator interface mechanisms 156, and other control system functionality 158. Data store 148 can include one or more maps 160, digital fences 162, equipment dimensions 164 for a plurality of different pieces of equipment, equipment model 166, and other items 168.

Digital fence generation system 150 can include boundary identifier 170, drivable area identifier 172, passable area identifier 174, work area identifier 176, feature addition system 178, tolerance generator 180, buffer addition system 182, and other items 184. Operating envelope control system 152 can include equipment collision point identifier 186, digital fence accessing system 188, sensor limiting condition detector 190, location evaluation triggering system 192, geographic location system 194, threshold distance comparison system 196, collision point projection system 198, boundary crossing detector 200, limitation enforcement system 202, and other items 204. Collision point projection system 198 can include forward projection system 206, transverse projection system 208, and other items 210. Limitation enforcement system 202, can include heading limitation system 212, turn limitation system 214, speed limitation system 216, implement control signal generator 218, and other items 220. Controllable subsystems 154 can include propulsion control subsystem 222, steering control subsystem 224, and other controllable subsystems 226.

FIG. 3 also shows that, in one example, machine control system 126 is operated by an operator 228. Operator 228 can interact with operator interface mechanisms 156 to control and manipulate machine control system 156 and thus tractor 102 and possibly some portions of towed implement 104. Operator interface mechanisms 156 may include a steering wheel, joysticks, pedals, linkages, levers, buttons, dials, a display device, a point and click device, a touchscreen, or wide variety of other visual, audio and haptic input/output devices.

Before describing the overall operation of machine control system 126 in more detail, a description of some of the items in machine control system 126 and their operation will first be provided.

Digital fence generation system 150 generates a digital fence with boundaries defining the periphery of a worksite, such as a field. Operating envelope control system 152 detects how close the agricultural machine is to the boundaries and, if close enough, limits the operating envelope of the machine. In limiting the operating envelope of the machine, control system 152 can control controllable subsystems 154. For instance, control system 152 can control propulsion control subsystem 222 to limit the maximum speed of the machine. Control system 152 can control steering control subsystem 224 to limit the turning angle and/or heading of the machine.

Digital fence generation system 150 uses boundary identifier 170 to identify the boundary of a field. Boundary identifier 170 can access a prior map 160 to identify a boundary of the field. Boundary identifier 170 may also identify the boundary of a field based upon a vehicle driving around the boundary and marking the boundary. Similarly, boundary identifier 170 can identify the boundary based upon a prior operation (such as a seeding operation, a tillage operation, etc.).

Drivable area identifier 172 identifies an area within the boundary that is drivable. For instance, drivable area identifier 172 may identify the particular passes that a machine took during a previous operation. By accessing the dimensions 164 of the machine and the location of the ground engaging elements (e.g., wheels, tracks, etc.) of the machine, the actual area where a machine was driven and where the ground engaging elements contacted the ground can be identified as the drivable area within the identified boundary.

Passable area identifier 174 identifies the area that is passable by the agricultural machine. For instance, by knowing the dimensions 164 of the machine and how far the machine protrudes beyond the wheel base of the machine, the area of a field where the machine passed during a prior operation can be identified as the passable area. This may be larger than the drivable area in that the machine frame, for instance, may be larger than the wheel base of the machine so that the area where the machine actually passed is larger than the area where the wheels or other ground engaging elements passed.

Work area identifier 176 identifies the area of the field where work was performed. This may also be larger than the passable area. For instance, a sprayer may have a boom with nozzles that spray a chemical in an area that extends beyond the physical dimensions of the boom. Thus, work is performed in an area that is larger than the passable area in the field and thus the work area may be identified to be larger than the passable area.

Feature addition system 178 can be used to add features to the boundaries. For instance, a field may include a rock, a tile inlet, a wet area, debris, holes, ditches, an old building foundation, telephone poles, etc. These features can be added to the digital fence. In one example, feature addition system 178 controls operator interface mechanisms 156 so that operator 228 can manually add the location of a feature. For instance, operator 228 may hold a mobile device and manually traverse the boundary of a rock or ditch or other feature so that it can be added to the digital fence. In another example, an automated perception system, such as a camera, a mechanical sensor, a RADAR or LIDAR sensor, or another automated perception system can detect the feature and automatically add the location of the feature to the digital fence. In yet another example, the feature can be automatically added to the digital fence but then an operator interface display can be generated to allow operator 228 to review and confirm the addition of the feature or reject the addition of the feature. These are examples only.

Tolerance generator 180 then identifies a tolerance value corresponding to the boundaries, the different areas identified, and the features that have been added. The tolerance may be based upon how accurately the machine can be steered (e.g., the machine steering characteristics), the accuracy of the sensors that have been used to generate the boundaries and/or based on other tolerance criteria. Buffer addition system 182 then adds a buffer to the boundary locations and the feature locations based upon the tolerance. For instance, it may be that a buffer of twelve inches is added to all of the boundary lines around a field and around features that have been added to the digital fence. This is just one example.

The digital fence can then be stored as one of digital fences 162 in data store 148, or it can be loaded into operating envelope controls system 152, or it can be processed in other ways.

Equipment collision point identifier 186 in operating envelope control system 152 identifies the collision points of the agricultural equipment that is being used. Equipment collision point identifier 186 can access the equipment dimensions 164 and/or equipment model 168 from data store 148 or from another location and identify the collision points that are to be used for the equipment.

Digital fence accessing system 188 then accesses the digital fence 162 for the field that is going to be operated on. Sensor limiting condition detector 190 detects any sensor limiting conditions. For instance, if the agricultural machine uses an optical sensor, and it is a foggy day or there is a great deal of dust or debris or other obscurants in the air, then these conditions (the fog, dust or obscurants, etc.) can be detected by sensor limiting condition detector 190 and used by control system 152 to increase a tolerance or buffer or to otherwise control the machine.

Geographic location system 194 identifies the geographic location (and, for example, the orientation and heading) of the agricultural machine. Therefore, geographic location system 194 may include a GPS receiver or another GNSS receiver, a dead reckoning system, a cellular triangulation system, one or more gyroscopes, initial measurement units, or other sensors that generate an output indicative of the geographic location of the agricultural machine.

Location evaluation triggering system 192 determines whether it is time to evaluate the location of the agricultural machine relative to the boundaries identified in the digital fence. In one example, the triggering criteria may be time based criteria. As an example, it may be that the operating envelope control system 152 evaluates the location of the agricultural machine relative to the boundaries every 100 milliseconds, every 200 milliseconds, etc. The trigger criteria can also be variable. For instance, if the agricultural machine is traveling at a high rate of speed, then the triggering criteria may be one set of criteria (such as 100 milliseconds) whereas if the agricultural machine is traveling at a relatively low rate of speed then the triggering criteria may be a different set of time criteria (such as 200 milliseconds). The criteria can be other criteria as well.

When location evaluation triggering system 192 determines that it is time to evaluate the location of the agricultural machine, then geographic location system 194 identifies the geographic location of the agricultural machine and threshold distance comparison system 196 compares the location of the machine to the boundaries in the digital fence to see if the machine is close enough to the boundaries (e.g., within a threshold distance) so that further analysis needs to be done. For instance, if the agricultural machine is in the middle of the field and is not close to any marked features in the field, then no analysis needs to be done to determine whether to limit the operating envelope of the machine. However, if the machine is within a threshold distance of a boundary or feature in the digital fence, then this may indicate that an analysis is to be done to determine whether the operating envelope of the agricultural machine should be limited.

Assuming that the analysis is to be performed, then boundary crossing detector 200 analyzes the different collision points to determine whether they have already crossed a boundary, or whether they are still within the boundaries defined by the digital fence. This is described in greater detail below with respect to FIG. 8. Assuming that the identified collision points are all still within the boundary of the digital fence, then collision point projection system 198 uses forward projection system 206 to project the collision points forward to see if they are about to cross a boundary or collide with a boundary or feature. The amount by which the collision points are projected forward may be based on the heading, course, and/or bearing of the machine, based on how close the agricultural machine is to a boundary, the speed of the agricultural machine, the ability of the agricultural machine to stop, or based on other criteria. Boundary crossing detector 200 can also access an equipment model 166 which models the behavior of the equipment. For instance, equipment model 168 may model the stopping behavior of the equipment (such as how long it takes the equipment to stop under different circumstances and at different speeds), the turning behavior of the equipment (such as angles through which the equipment can be turned, the responsiveness in turning, among other things. If the projected collision points are encroaching upon or cross a boundary, then this can be indicated to control system 152 which can limit the operating envelope of the agricultural machine accordingly.

Even if the projected collision points are not encroaching upon or crossing a boundary, transverse projection system 288 projects the collision points in a direction transverse to the heading of the agricultural machine. For instance, it may be that the agricultural machine is traveling closely proximate a boundary, such as the agricultural machine in position 106 in FIG. 1. In that case, transverse projection system 208 can project the collision points transversely toward boundary 118 to determine whether machine 102 could be steered in such a way that the collision could quickly cross boundary 118. If so, this can be indicated to limitation enforcement system 202 which can limit the operating envelope of the agricultural machine to inhibit the machine from being steered toward the boundary.

If it is determined that the operating envelope of the agricultural machine should be limited, limitation enforcement system 202 identifies and enforces the limitations on the operating envelope. For instance, if the agricultural machine is operating close to a boundary, then heading limitation system 212 may preclude the agricultural machine from being turned in a direction where it would quickly cross the boundary. Turn angle limitation system 214 may limit the turn angle of the machine based upon how close the machine is to the boundary, the speed of the machine, etc. Speed limitation system 216 can limit the operating speed of the machine. For instance, if a collision point on the agricultural machine is rapidly approaching a boundary, and the agricultural machine takes a relatively large distance within which to stop, then speed limitation system 216 can limit the operating speed of the machine so that it will be able to stop prior to having one of its collision points cross the boundary.

It may also be that the agricultural machine includes a towing vehicle, such as tractor, and a towed implement. Some towed implements may have independently steerable axles so that they can be steered to more closely follow a predictable path behind the towing vehicle. In such a scenario, implement control signal generator 218 generates a control signal to steer the steerable axle of the implement in order to avoid colliding with a boundary of feature in the digital fence. The implement can be controlled in other ways as well.

Figure 4:
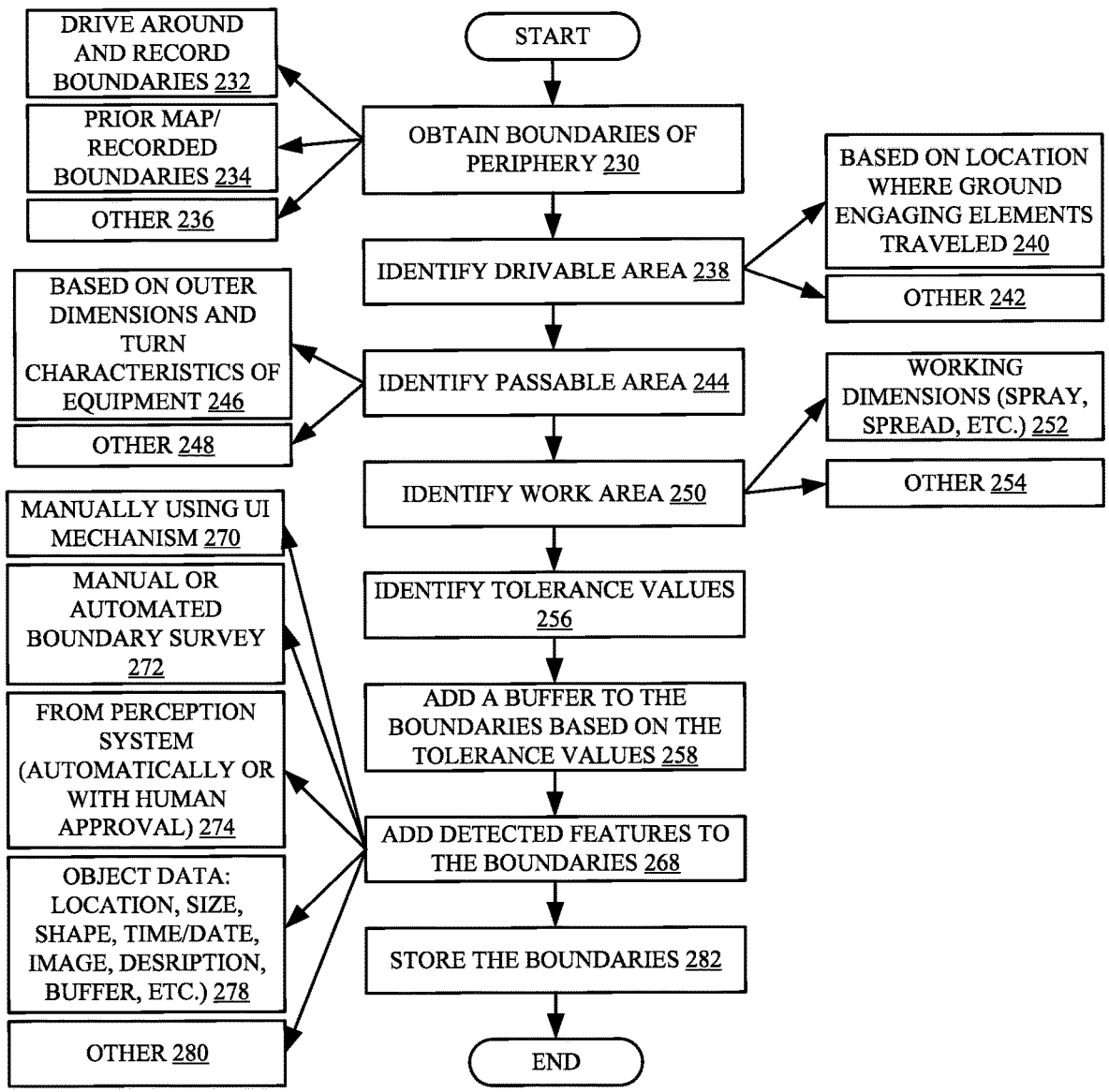
FIG. 4 is a flow diagram illustrating one example of generating a digital fence.

FIG. 4 is a flow diagram illustrating one example of the operation of digital fence generation system 150 in generating a digital fence. Boundary identifier 170 first obtains the boundaries of the periphery of the field, as indicated by block 230 in the flow diagram of FIG. 4. In one example, the boundary of the periphery are obtained by driving around the periphery of the field in a vehicle and recording the geographic location of the boundaries, as indicated by block 232. In another example, the boundaries of the periphery of the field may be obtained from a prior map 160 or from other prior recorded boundaries, as indicated by block 234. The boundaries of the periphery of the field can be obtained in other ways as well, as indicated by block 236.

Drivable area identifier 172 then identifies the drivable area in the field, as indicated by block 238. The drivable area is identified based upon the location where the ground engaging elements of a machine have already traveled in that field, as indicated by block 240. The drivable area can be identified in other ways as well, as indicated by block 242.

Figure 6:
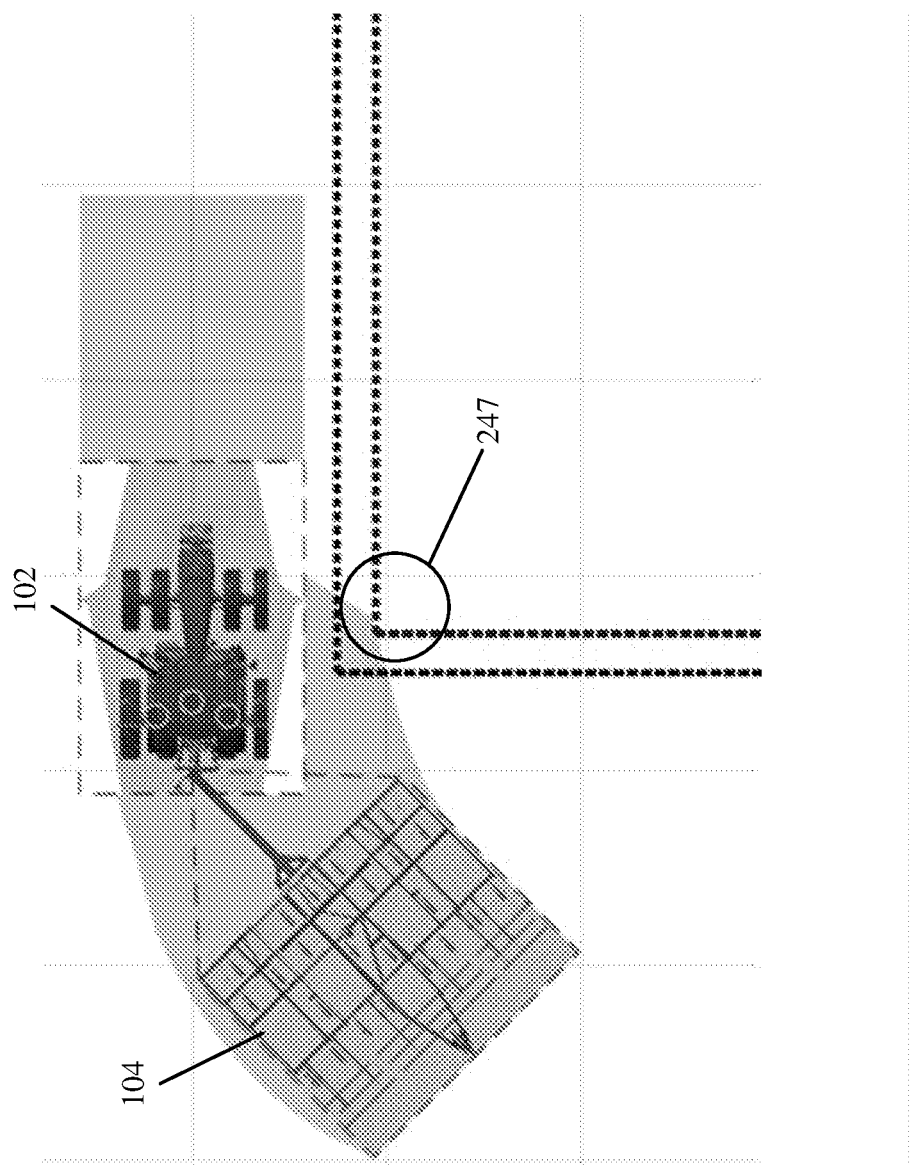
FIG. 6 illustrates the path of a towed implement around a corner.

Passable area identifier 174 then identifies the passable area in the field, as indicated by block 244. The passable area can be identified based upon the outer dimensions and turn characteristics of the equipment, as indicated by block 246. Referring, to FIG. 6, it can be seen that the tractor 102 is towing a tillage implement 104. While the tractor has successfully navigated a corner 247 of the field, the tillage implement may, in fact, follow a path that is closer to the corner 247 and thus cross the boundary of the corner of the field. Therefore, the passable area of the field can be identified based upon the turn characteristics of the agricultural machine as well as its dimensions, and the actual drivable area of the field. The passable area may well exceed or extend beyond the drivable area in certain places. The passable area of the field can be identified in other ways as well, as indicated by block 248.

Work area identifier 176 then identifies the work area of the field, as indicated by block 250. The work area may be identified based upon the working dimensions of the agricultural machine. For instance, if the agricultural machine is a sprayer or spreader, then the working dimensions may include the area beyond the physical periphery of the machine, that is sprayed with chemicals or where chemicals are spread. Identifying the work area based upon the working dimensions of the machine is indicated by block 252. The work area may be identified in other ways as well, as indicated by block 254.

Tolerance generator 180 then identifies the tolerance values that will be added to the boundaries as a buffer. Identifying tolerance values is indicated by block 256. The tolerance values can be based upon the driving characteristics and machine dimensions represented by the equipment dimensions 164 and equipment model 166. The tolerance values can be based on other criteria as well.

Figure 5:
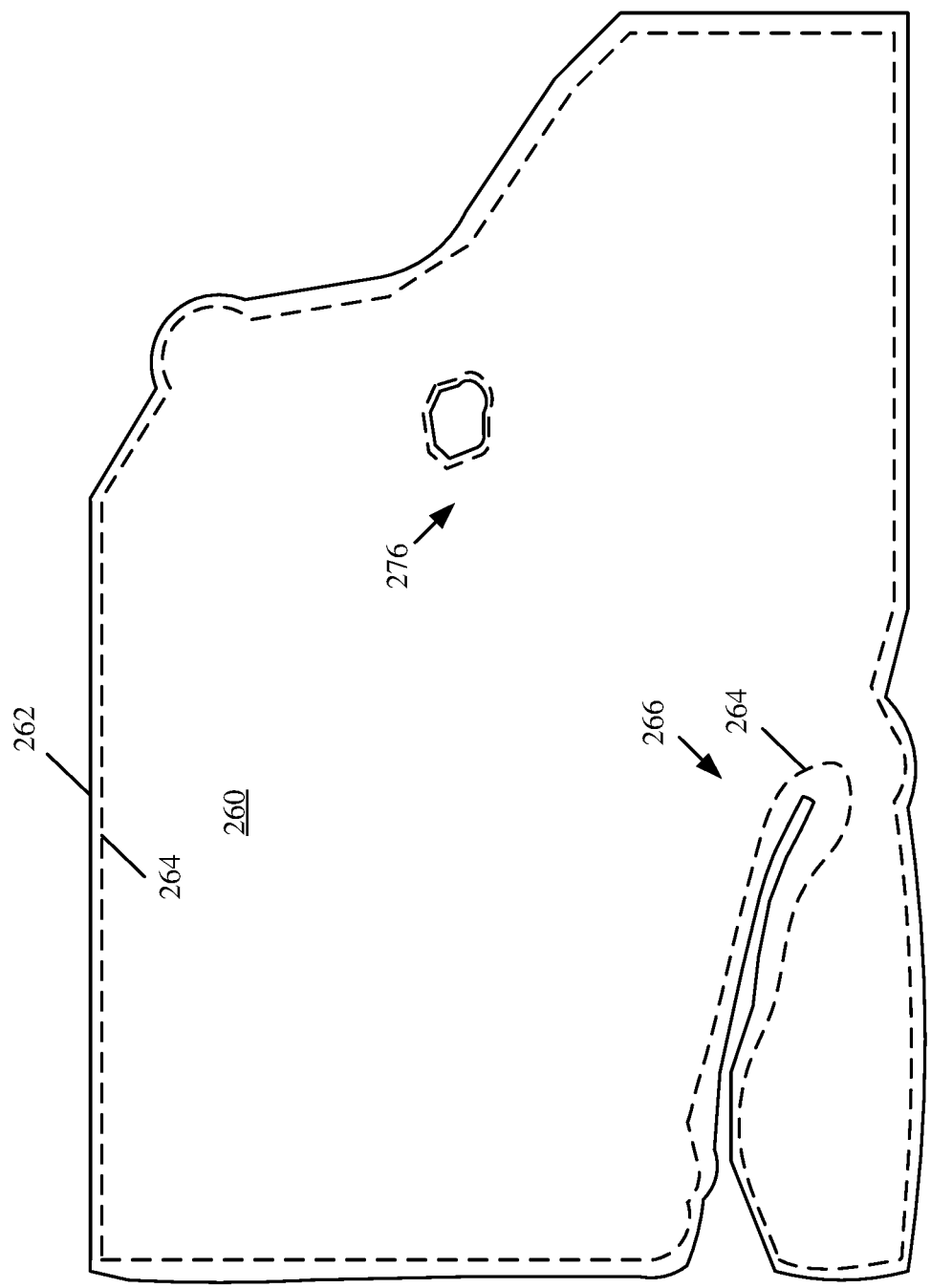
FIG. 5 is a pictorial illustration of one example of a digital fence.

Buffer addition system 182 then adds a buffer to the boundaries based upon the tolerance values, as indicated by block 258. Similarly, FIG. 5 shows one example of a field 260 that has a boundary represented by the solid line 262. The buffer is represented by the dashed line 264. As shown in FIG. 5, the buffer may be larger in certain areas and smaller in other areas. For instance, where a sharp turn in the field boundary will be needed, such as in the area shown at 266, the boundary 264 in that area may be larger than it is in other areas, based upon the turning characteristic of the agricultural machine that will be used in the field. Again, referring to FIG. 6, it may be that the implement 104 will not follow directly behind the tractor 102 so that the boundary needs to be larger in areas where a sharp turn or corner is to be encountered.

Referring again to FIG. 4, feature addition system 178 can then add any detected features to the boundaries in the digital fence, as indicated by block 268. The feature addition system 178 can generate a user interface that operator 228 can interact with in order to manually add features using a user interface mechanism 156, as indicated by block 270. The features can be added using a manual or automated boundary survey, such as by allowing an operator to drive around or walk around the feature, as indicated by block 272. The features can be added using a perception system either automatically or with human approval, as indicated by block 274. FIG. 5 shows an example of a feature, such as a boulder or rock shown generally at block 276. The object data that identifies the feature 276 may include such things as the geographic location of the feature, the size of the feature, the shape of the feature, the time or date when the feature was identified, an image or description of the data, a buffer area around the data, or other object data 278. The features can be detected and added to the boundaries in other ways as well, as indicated by block 280.

Digital fence generation system 150 then stores the boundaries as a digital fence 162. The digital fence can be stored in local data store 148, a remote data store, or other data stores. Storing the boundaries as a digital fence is indicated by block 282 in the flow diagram of FIG. 4.

Figure 7A:
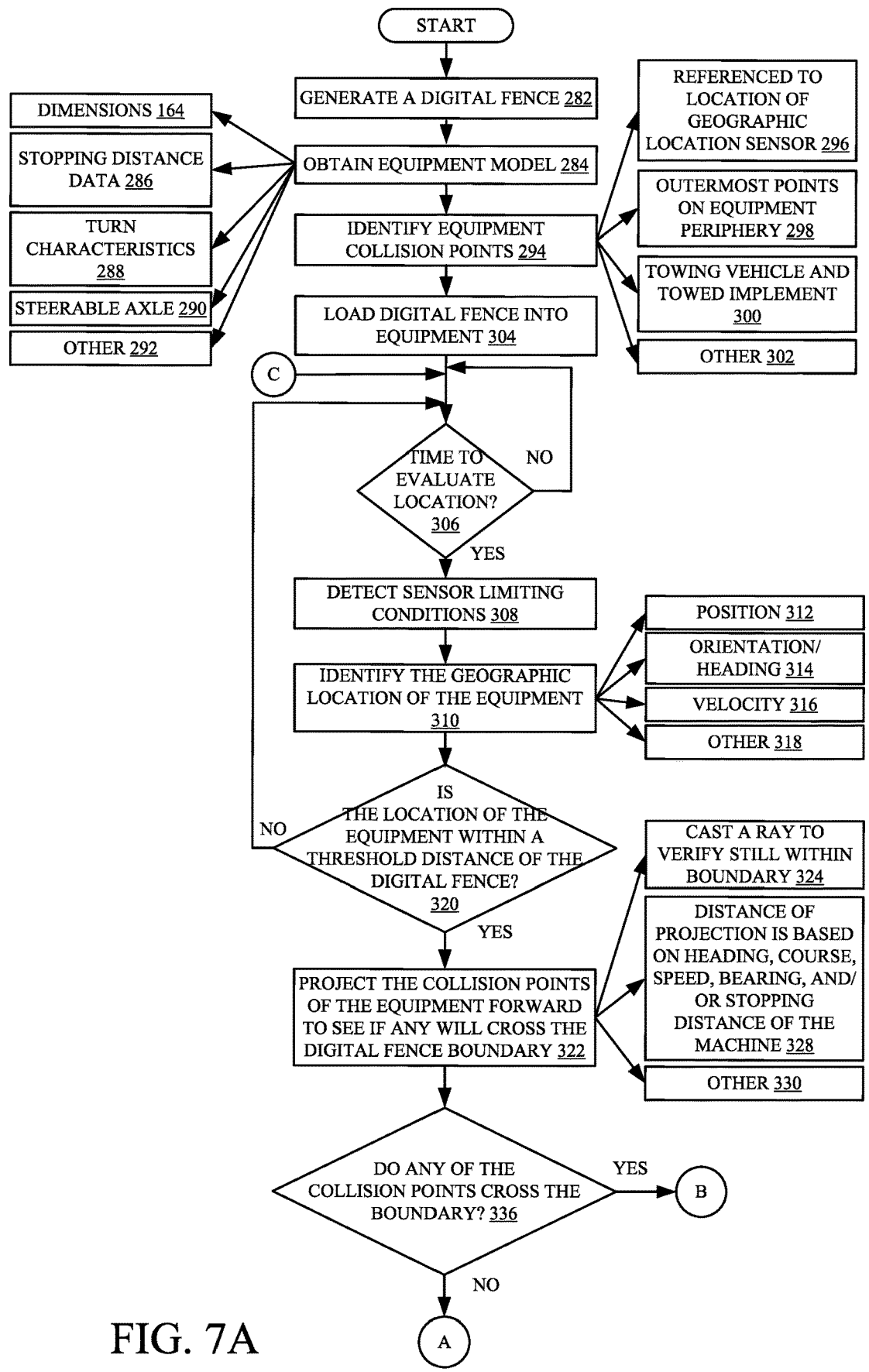
FIGS. 7A and 7B (collectively referred to herein as FIG. 7) show a flow diagram illustrating one example of determining when to limit operating parameters of off-road equipment based upon the position of the off-road equipment relative to a boundary.
Figure 7B:
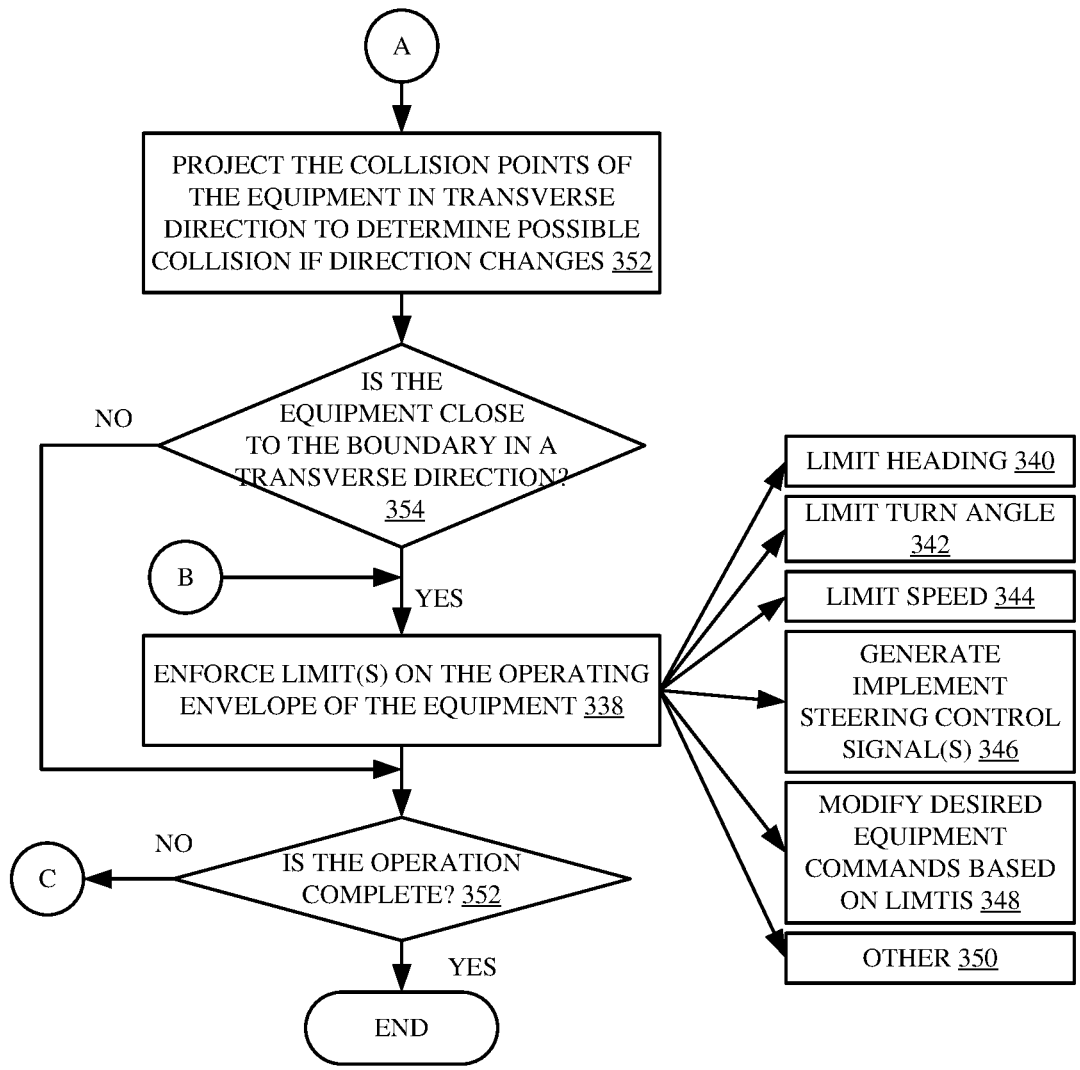

FIGS. 7A and 7B (collectively referred to herein as FIG. 7) show a full diagram illustrating one example of the operation of machine control system 126 in limiting the operating envelope of the agricultural machine, where limitation is warranted, given the location of the agricultural machine relative to the boundary.

Digital fence generation system 150 first generates a digital fence, as indicated by block 282 in the flow diagram of FIG. 7. Equipment collision point identifier 186 may then obtain an equipment model 166, as indicated by block 284. The equipment model may include the equipment dimensions 164, or those may be obtained separately. The equipment model 166 may model the stopping distance 286 of the equipment, the turn characteristics 288, of the equipment, it may indicate that the equipment has a steerable axle 290, or it may identify other items 292.

Equipment collision point identifier 186 then identifies the equipment collision points, as indicated by block 294. The equipment collision points may be referenced to the geographic location sensor in geographic location system 194, as indicated by block 296. The collision points may illustratively be the outermost points on the equipment periphery, as indicated by block 298, and the collision points may be identified on the towing vehicle and a towed implement as indicated by block 300, or in other ways, as indicated by block 302.

Digital fence accessing system 188 loads the digital fence 162 into the operating envelope control system 152, as indicated by block 304. Location evaluation triggering system 192 then determines whether it is time to evaluate the location of the equipment, as indicated by block 306 and, if so, sensor limiting condition detector 190 detects any sensor limiting conditions, as indicated by block 308.

Geographic location system 194 then identifies the geographic location of the equipment as indicated by block 310. The geographic location can include the geographic position 312, orientation/heading 314, velocity 316, and other information 318 corresponding to the geographic position of the equipment. Threshold distance comparison system 196 then determines whether the equipment is within a threshold distance of the digital fence (e.g., the boundary or the boundary plus the buffer), as indicated by block 320. If not, then no further analysis needs to be performed relative to the geographic position of the equipment and the digital fence, and processing reverts to block 306. However, if, at block 310, it is determined that the location of the equipment is within the threshold distance of the digital fence, then collision point projection system 198 projects the collision points of the equipment.

Figure 8:
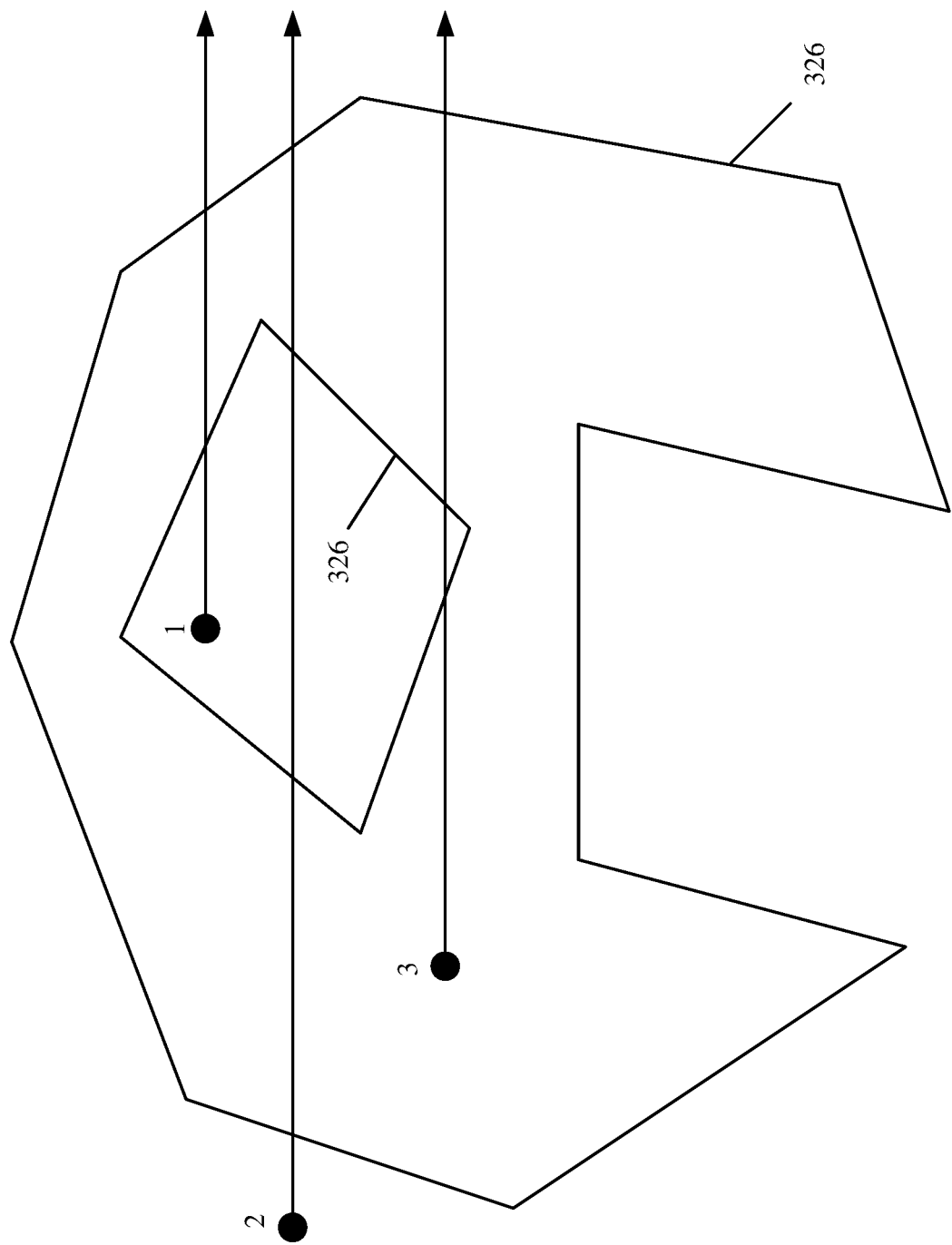
FIG. 8 is a pictorial illustration showing how a determination is made as to whether the off-road equipment is within the boundary.

Forward projection system 206 projects the collision points of the equipment forward to see if any are already outside the boundary, or are encroaching upon, or crossing the digital fence boundary, as indicated by block 322. In one example, collision point projection system 198 is first controlled by boundary crossing detector 200 to project the collision points forward by casting a ray in any direction to verify that the collision points are still within the boundary of the field, and have not already crossed the boundary of the field, as indicated by block 324. One example of this is shown in FIG. 8. Assume, in FIG. 8, that the boundary of the field is represented by the solid line 326. Then, assume that three collision points on the vehicle are labeled 1, 2, and 3 in FIG. 8. If the number of boundary crossings is odd, this means that the collision point is still within the boundary 326 of the field, whereas if the number of boundary crossings is even, this will indicate that the point is outside the boundary of the field.

It can be seen, for example, in FIG. 8 that a ray is cast from each of the collision points 1, 2, 3 along an X axis in FIG. 8. The ray projected from collision point 1 crosses two boundaries, which is an even number indicating that collision point 1 is outside the boundary 326. The ray cast from collision point 2 crosses four boundaries indicating that it is also outside of the boundary 326. The ray cast from collision point 3 crosses the boundary three times, which is an odd number, indicating that collision point 3 is within the boundary 326. Therefore, as a first step, collision point projection system 198 can be controlled by boundary crossing detector 200 to cast a ray in any direction from the collision points to verify that those collision points are still within the boundary.

Once it is verified that the collision points are still within the boundaries, then the points are cast forward by a certain projection distance to determine whether they are encroaching upon, or will cross, a boundary. The distance of the forward projection may be based on the stopping distance of the equipment or the speed of the equipment, or the heading, course, and/or bearing of the equipment, as indicated by block 328 in the flow diagram of FIG. 7. The collision points may be projected forward in other ways as well, as indicated by block 330.

Figure 9:
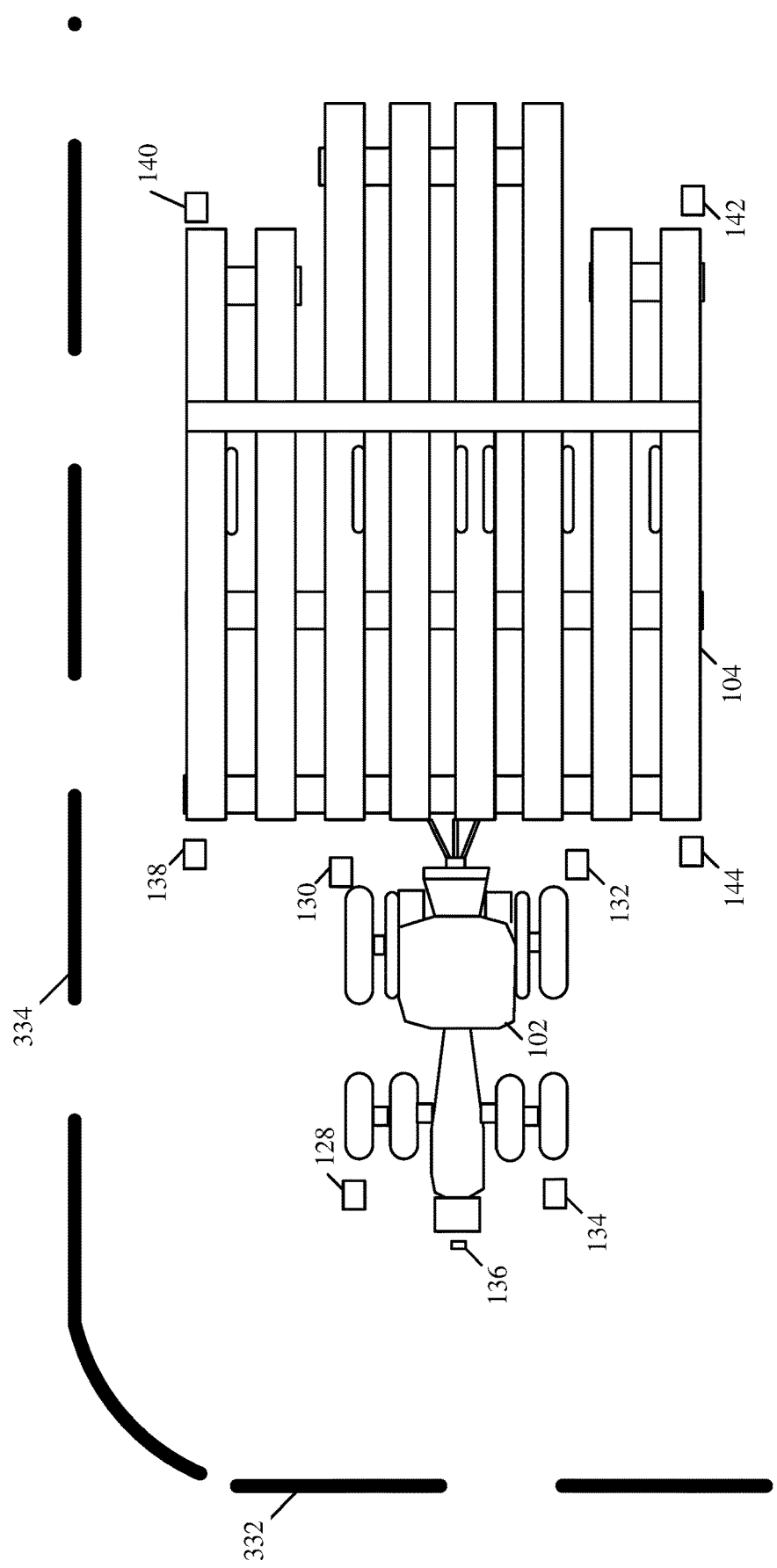
FIG. 9 is a pictorial illustration showing one example of off-road equipment in the corner of a field.
Figure 10:
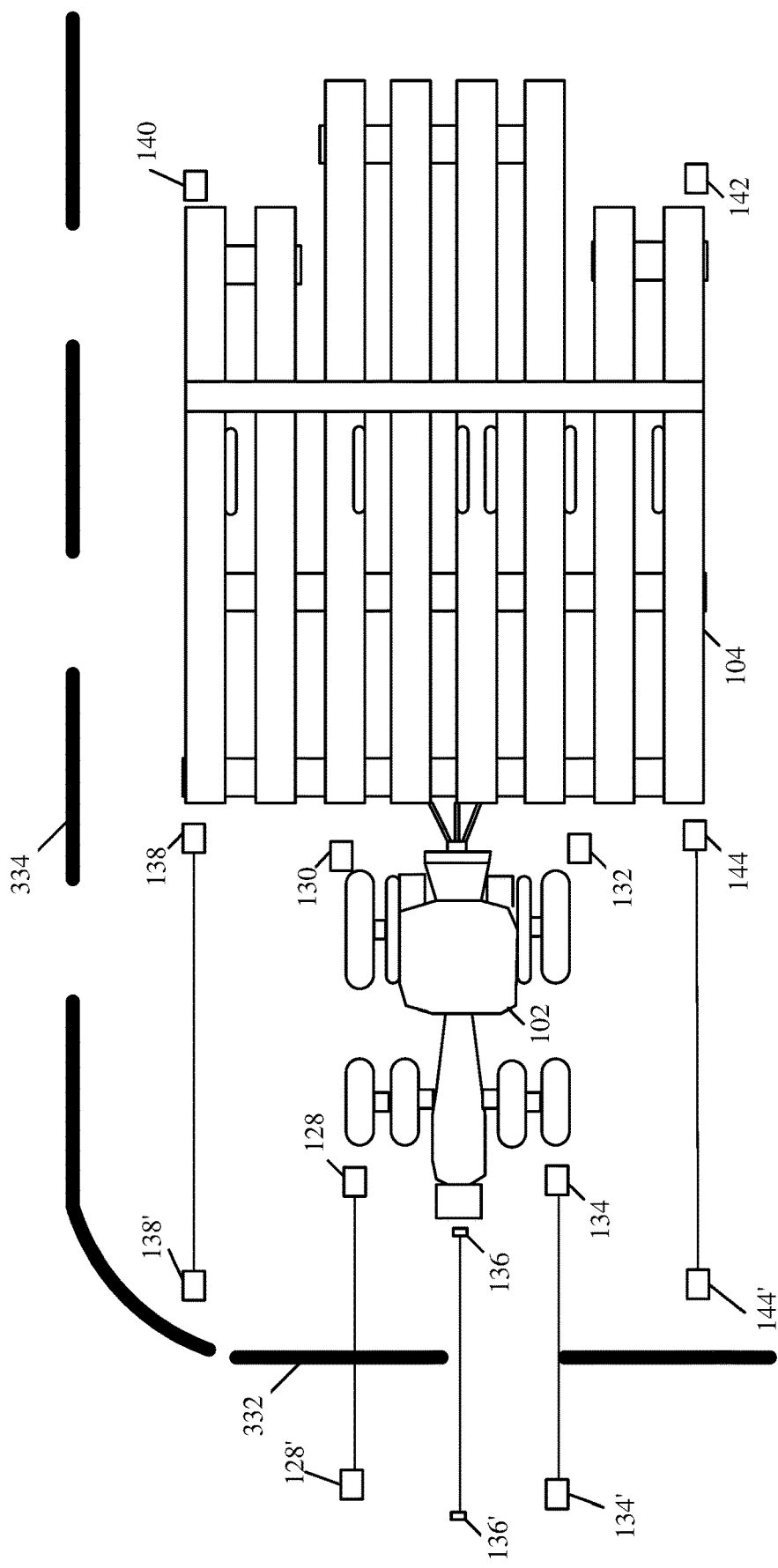
FIG. 10 shows the projection of collision points of agricultural equipment relative to a boundary.

FIGS. 9 and 10 show examples in which collision points are identified and projected forward to determine whether the equipment is approaching a boundary. FIG. 9 shows a tractor 102 pulling a tillage implement 104. The collision points are identified and are the same as shown in FIG. 2, and they are similarly numbered. The boundary of the field in which equipment 102, 104 is operating is indicated by first boundary 332 and second boundary 334. It can be seen that equipment 102, 104 is traveling closely adjacent boundary 334 and is approaching boundary 332.

FIG. 10 shows an example in which the collision points are projected forward toward boundary 332. Collision points 128, 136, and 134 on tractor 102 are projected forward to the locations indicated by projected collision points 128', 136', and 134'. Collision points 138 and 144 from implement 104 are projected forward to the points indicated by projected collisions points 138' and 144'. Boundary crossing detector 200 determines whether the projected collision points are outside the boundary. FIG. 10 shows that projected collision points 128', 136', and 134' have all crossed boundary 332. Determining whether any of the projected collision points have crossed the boundary is indicated by block 336 in the flow diagram of FIG. 7. If so, this means that limitation enforcement system 202 should limit the operating envelope of tractor 102 and/or implement 104 based upon its proximity to boundary 332. Thus, processing skips to block 338 where limitation enforcement system 202 enforces limits on the operating envelope of the equipment. Heading limitation system 212 can limit the heading 340 of the equipment. Turn angle limitation system 214 can limit the turn angle 342 of the equipment. Speed limitation system 216 can limit the speed 344 of the equipment. Implement control signal generator 218 can generate implement steering control signals to control steering of the implement, as indicated by block 346.

In addition, any operator inputs or other control inputs can be modified based upon the limitations, as indicated by block 348. For instance, assume that an operator has provided an input to have towing vehicle 102 moving at a speed of 12 miles per hour. In that case, limitation enforcement system 202 may limit the input to control the towing vehicle 102 to only operate at a speed of 8 miles per hour. The desired equipment commands can be modified based upon the limitations in other ways as well, as indicated by block 350.

Returning again to block 336 in FIG. 7, assume that the boundary crossing detector 200 determines that none of the projected collision points for the equipment will cross a boundary. In that case, then transverse projection system 208 projects the collision points of the equipment in a transverse direction relative to the heading of the equipment, to determine whether any collision points might cross a boundary if the direction of travel of the equipment changes. Projecting the collision point in a transverse direction is indicated by block 352 in the flow diagram of FIG. 7.

Figure 11:
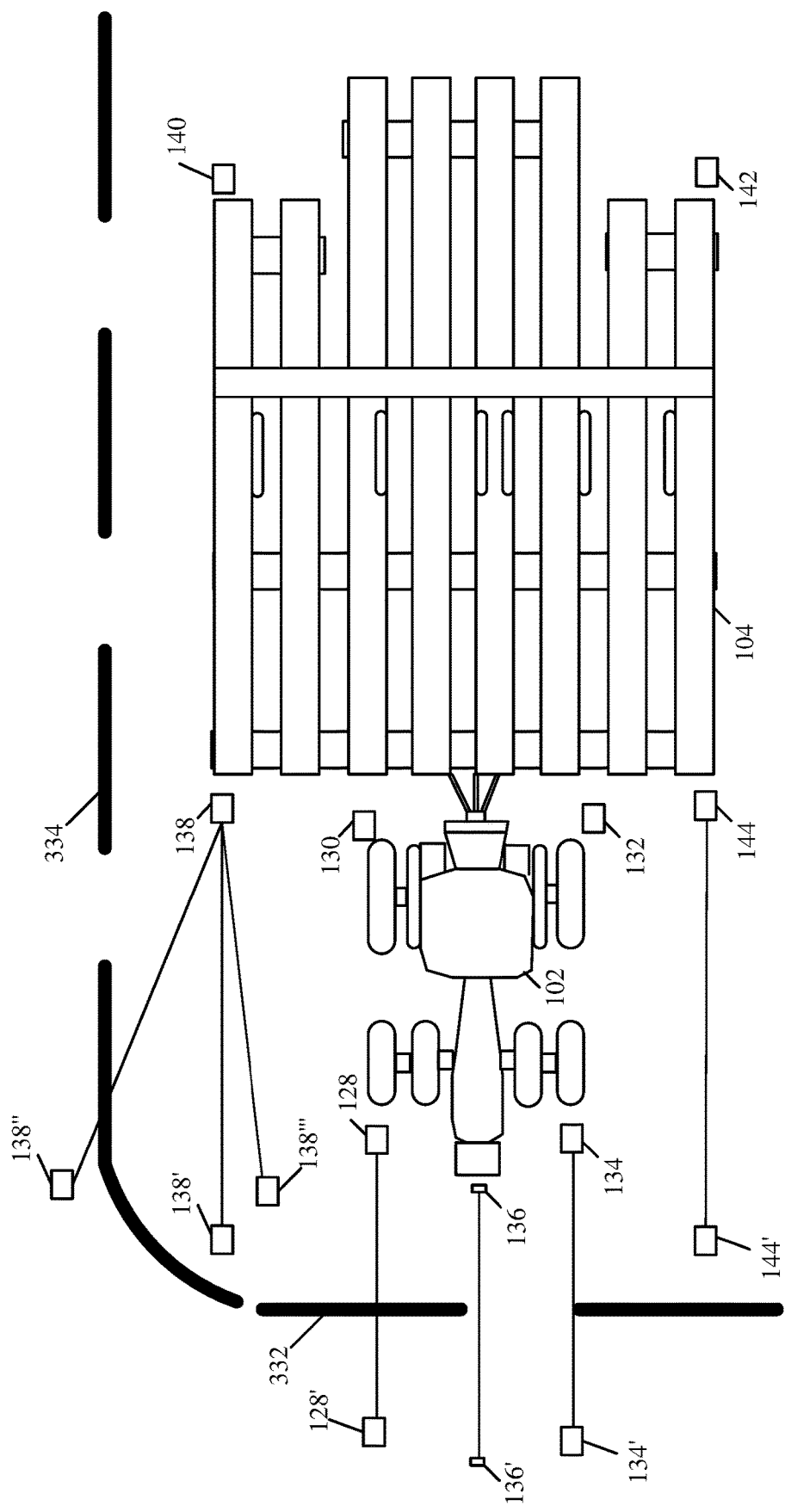
FIG. 11 shows the projection of collision points in a transverse direction.

FIG. 11 is similar to FIG. 10, and similar items are similarly numbered. However, FIG. 11 now shows that collision point 138 has not only been projected straight forward to the projected collision point 138', but it has also been projected in a transverse direction to the projected collision points 138" and 138'". It can be seen that collision point 138" has crossed boundary 334. This means that, should the towing vehicle 102 be turned to the right, collision point 138 could easily cross boundary 334.

Boundary crossing detector 200 then determines whether any of the projected collision points, that are projected in a direction transverse to the direction of travel of the equipment, will cross a boundary, as indicated by block 354. If so, processing again proceeds at block 338 where limitation enforcement system 202 enforces limitations on the operating envelope of the equipment. FIG. 11 shows one example of this. In the example shown in FIG. 11, boundary crossing detector 200 generates an output indicative of the boundary crossing of point 138" and limitation enforcement system 202 enforces limitations on the operating envelope of the equipment accordingly. By way of example, turn angle limitation system 214 may prevent towing vehicle 102 from being turned to the right. These and other limitations can be enforced as well.

If none of the projected collision points cross a boundary, as indicated by block 354, or once the limitations on the operating envelope of the equipment have been enforced as indicated by block 338, processing continues at block 352. If the operation that the equipment is performing is not yet complete, then processing reverts to block 306 where location evaluation triggering system 192 determines whether the location of the equipment should again be evaluated.

It can thus be seen that the present description describes a system which detects the location of equipment operating in a work area relative to the boundary of that work area or the boundary of a feature within the work area. The present system limits the operating envelope of the equipment based upon the location so that the equipment can be operated more efficiently with less concern that the equipment may cross a boundary.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, they can be actuated using touch gestures. Also, where the device that displays them has speech recognition components, they can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 12:
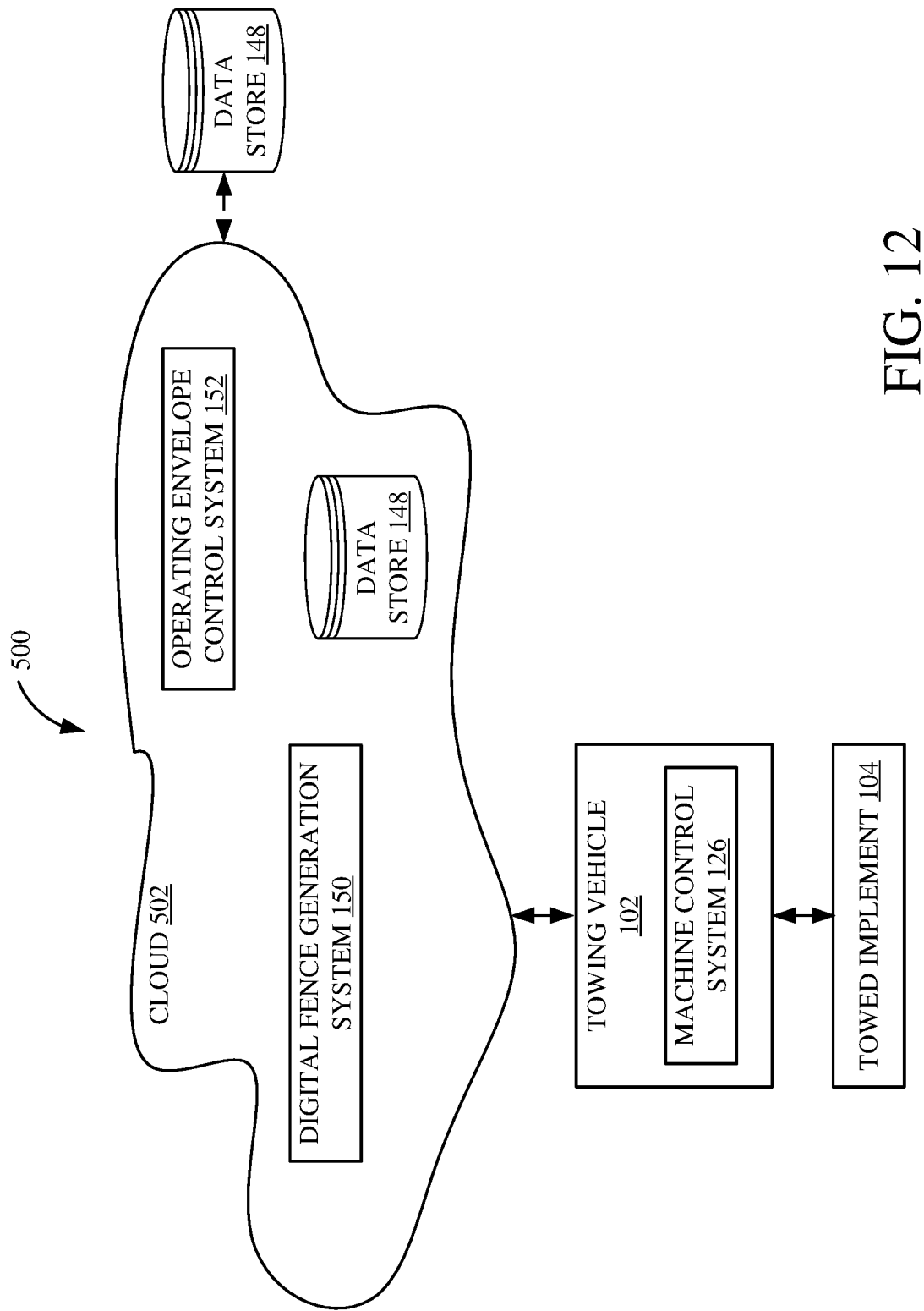
FIG. 12 shows one example of off-road equipment disposed in a remote server environment.

FIG. 12 is a block diagram of machine 502 with machine control system 126, shown in FIG. 1, except that system 126 communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 12, some items are similar to those shown in previous FIGS. and they are similarly numbered. FIG. 12 specifically shows that digital fence generation system 152 and operation envelope control system 152 and data store 148 can be located at a remote server location 502. Therefore, the off-road machine accesses those systems through remote server location 502.

FIG. 12 also depicts another example of a remote server architecture. FIG. 12 shows that it is also contemplated that some elements of previous FIGS. are disposed at remote server location 502 while others are not. By way of example, data store 148 can be disposed at a location separate from location 502, and accessed through the remote server at location 502. Regardless of where they are located, they can be accessed directly by the off-road machine, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the off-road machine comes close to the fuel truck for fueling, the system automatically collects the information from the off-road machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the off-road machine until the off-road machine enters a covered location. The off-road machine, itself, can then send the information to the main network.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 13:
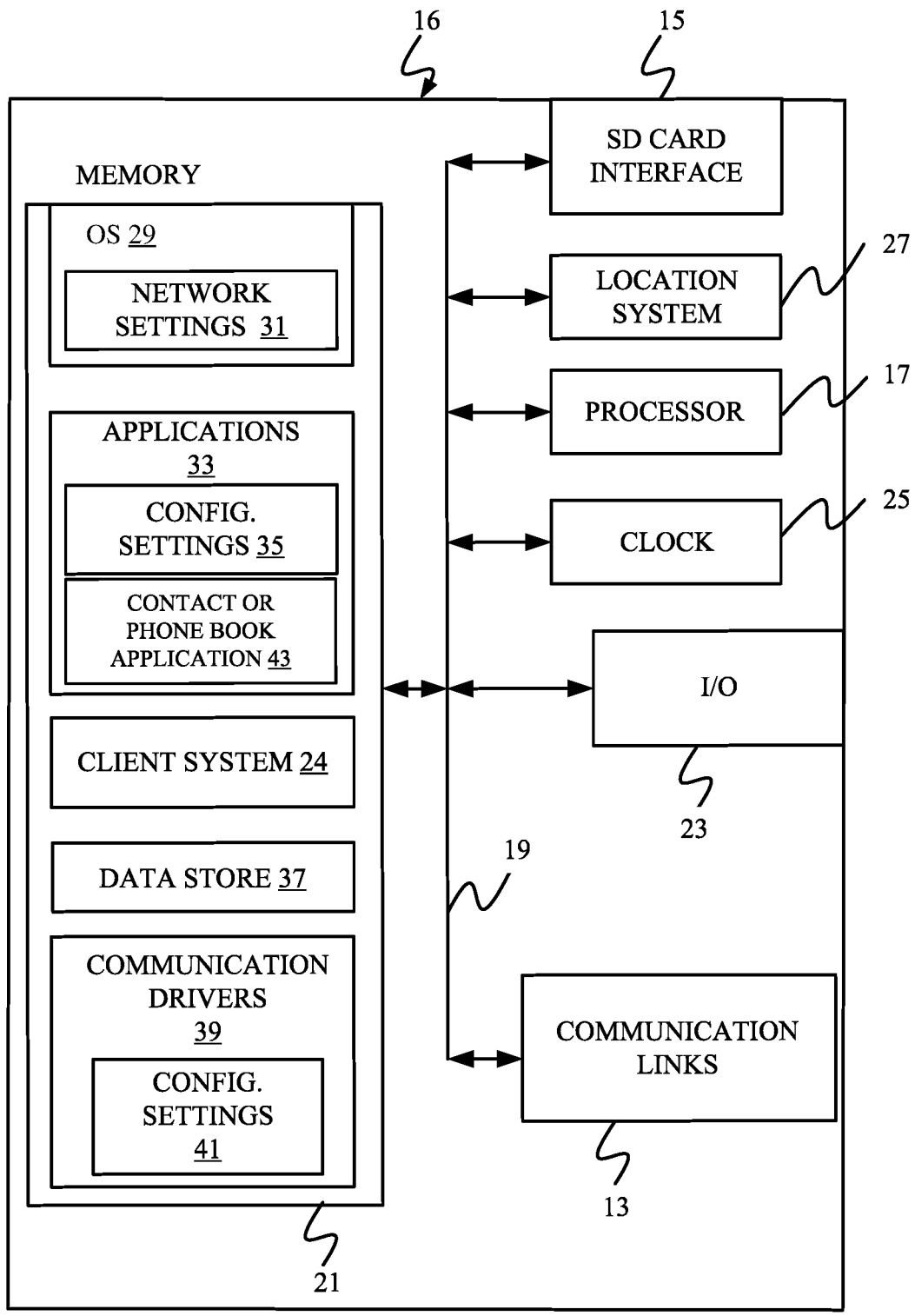
FIGS. 13-15 show example of mobile devices that can be used with off-road equipment.
Figure 14:
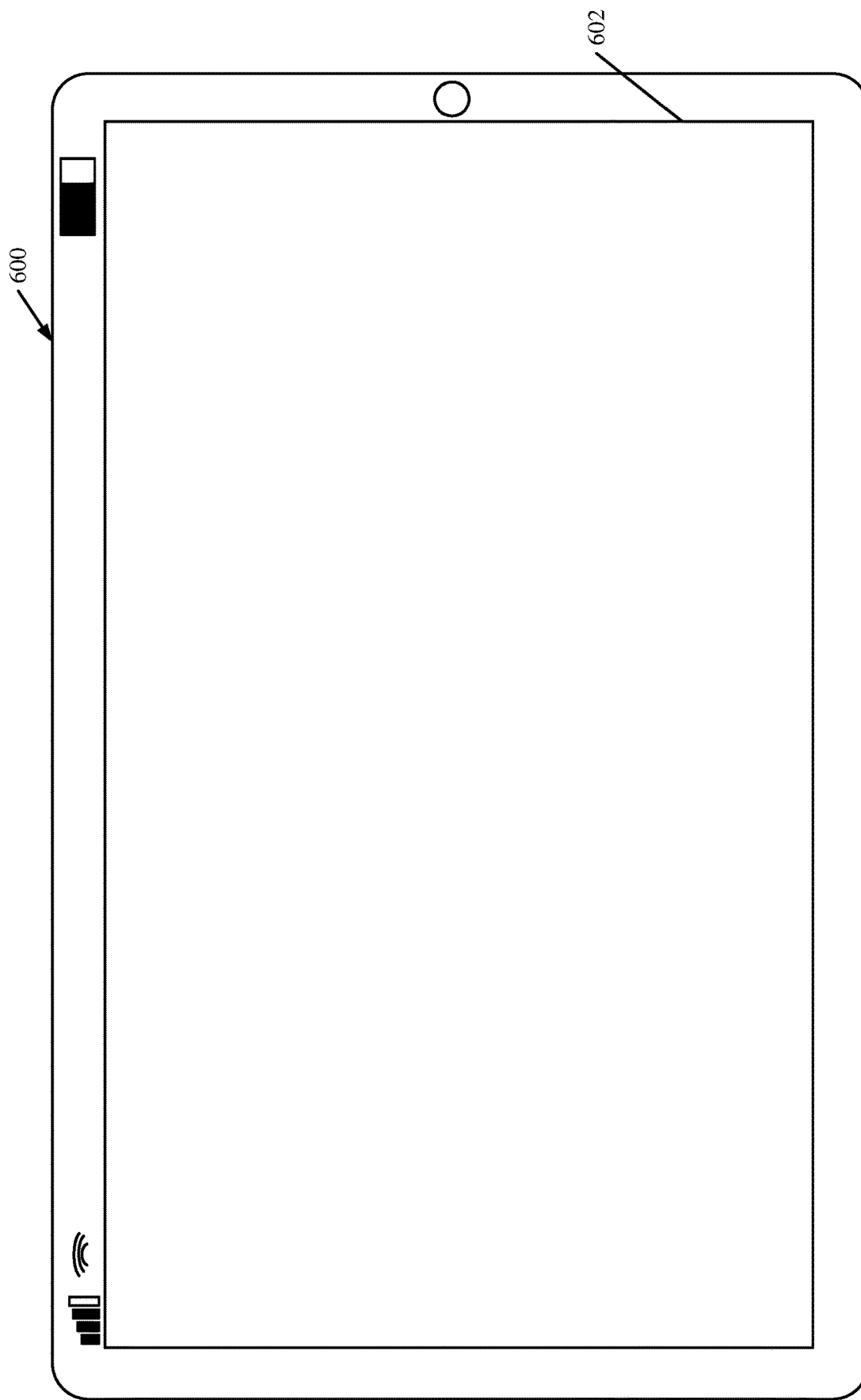
Figure 15:
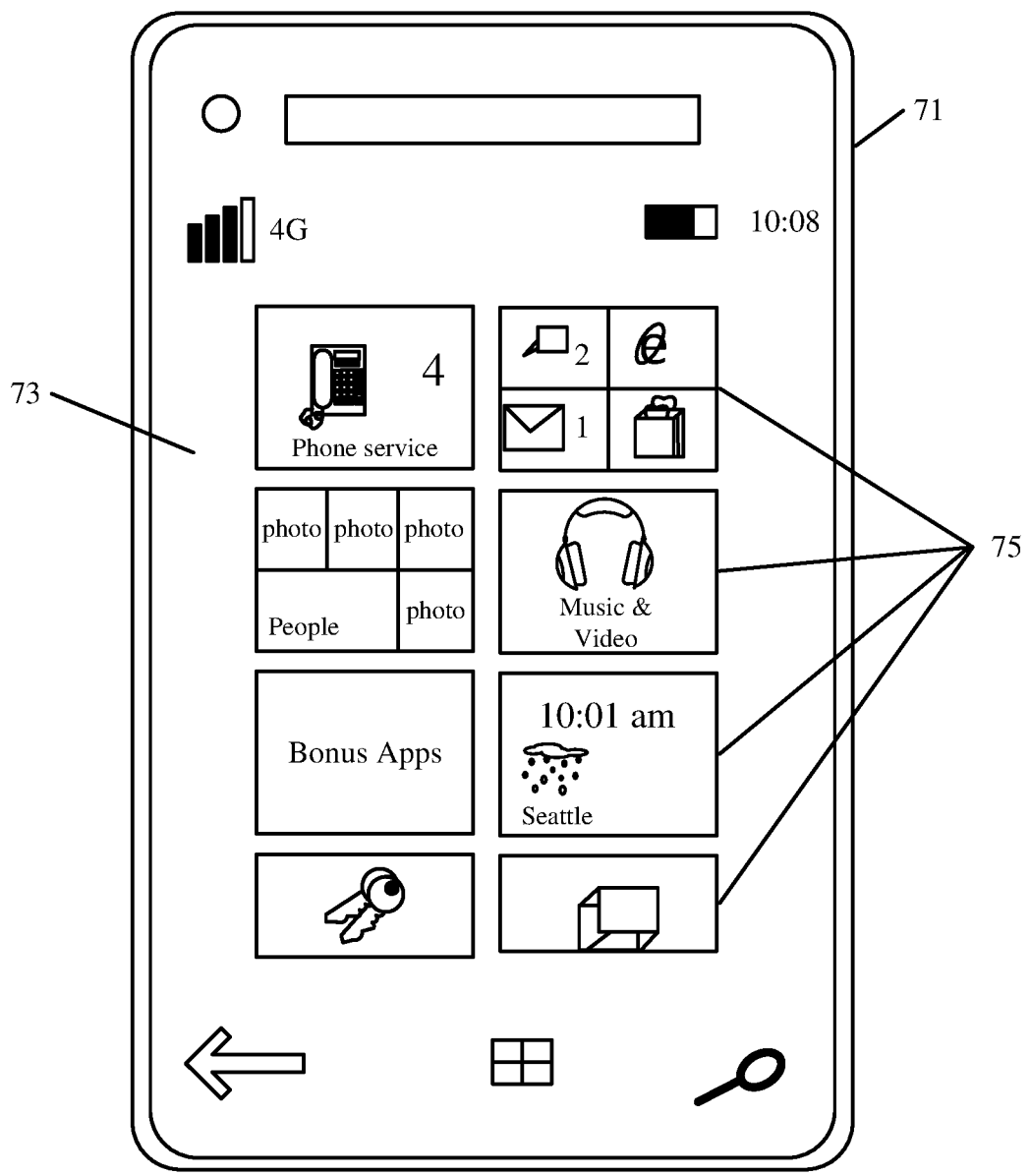

FIG. 13 is a simplified block diagram of one illustrative example of a handheld or mobile computing device that can be used as a user's or client's hand held device 16, in which the present system (or parts of it) can be deployed. For instance, a mobile device can be deployed in the operator compartment of tractor 102 for use in generating, processing, or displaying the collision points and position data. FIGS. 14-15 are examples of handheld or mobile devices.

FIG. 13 provides a general block diagram of the components of a client device 16 that can run some components shown in previous FIGS., that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various example of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 14 shows one example in which device 16 is a tablet computer 600. In FIG. 14, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 15 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 16:
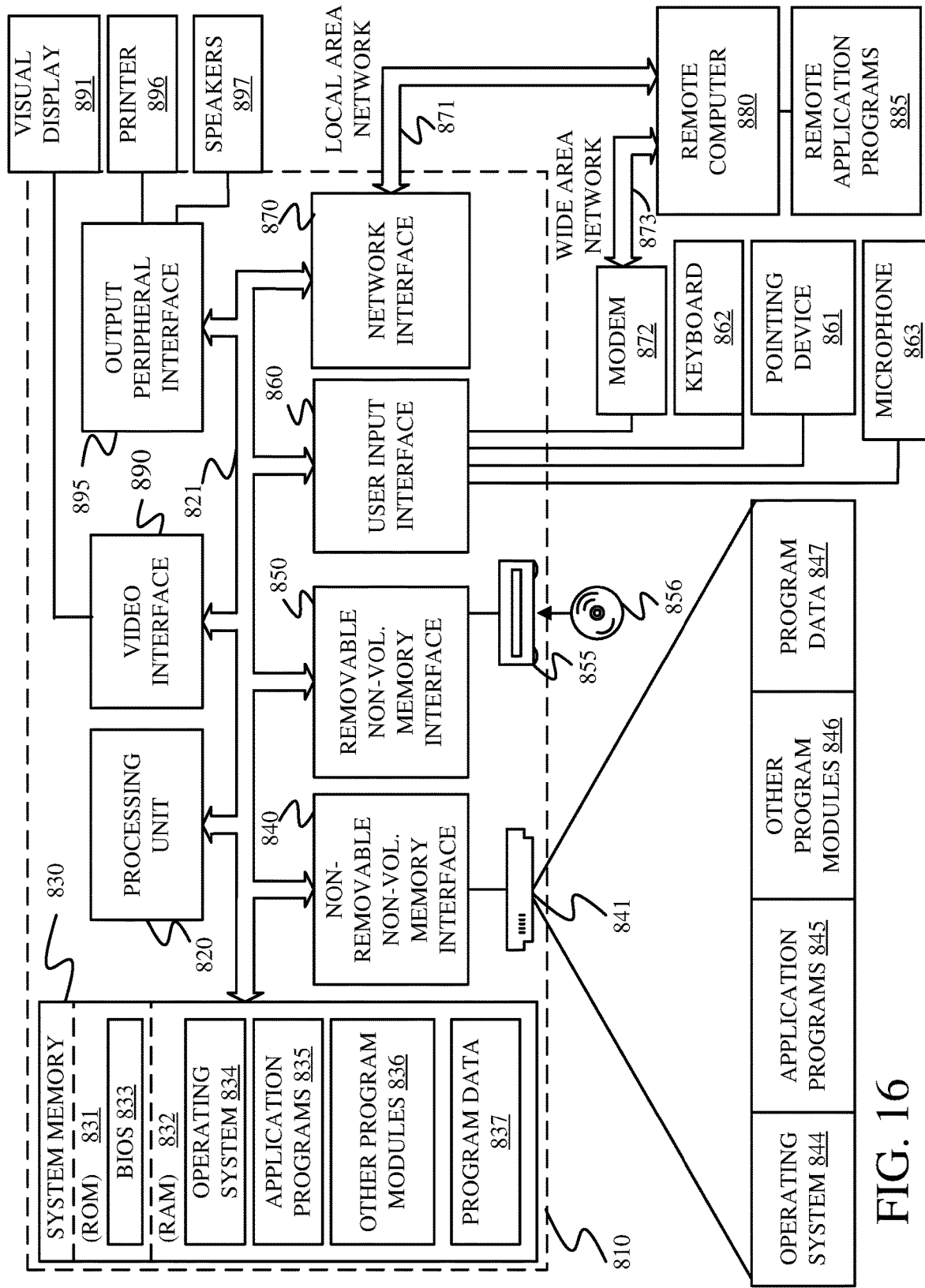
FIG. 16 is a block diagram of one example of a computing environment that can be used with off-road equipment.

FIG. 16 is one example of a computing environment in which elements of previous FIGS., or parts of it, (for example) can be deployed. With reference to FIG. 16, an example system for implementing some embodiments includes a general-purpose computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 16.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 16 illustrates operating system 834, application programs 835, other program modules 836, and program data 837.

The computer 810 may also include other removable/non-removable volatile/nonvolatile computer storage media. By way of example only, FIG. 16 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 16, provide storage of computer readable instructions, data structures, program modules and other data for the computer 810. In FIG. 16, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 16 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a machine control system, comprising:

a digital fence generation system that obtains a digital fence indicative of a boundary of a worksite on which an off-road machine operates;

a geographic location system that detects a geographic location of the off-road machine;

a threshold distance comparison system that determines that the off-road machine is within a threshold distance of the boundary;

a boundary crossing detector that determines whether a collision point of the off-road machine is encroaching on the boundary and generates an encroachment signal indicative of the determination; and a limitation enforcement system that controls limitation of an operating envelope of the off-road machine based on the encroachment signal.

Example 2 is the machine control system of any or all previous examples and further comprising:

an equipment collision point identifier configured to identify a collision point on a periphery of the of the off-road machine;

a collision point projection system configured to project the collision point away from the off-road machine to a projected collision point, wherein the boundary crossing detector is configured to determine whether the projected collision point is across the boundary.

Example 3 is the machine control system of any or all previous examples wherein the collision point projection system comprises:

a forward projection system configured to project the collision point in a direction away from the off-road machine parallel to a course or bearing of the off-road machine.

Example 4 is the machine control system of any or all previous examples wherein the collision point projection system comprises:

a transverse projection system projecting the collision point in a direction away from the off-road machine transverse to a bearing of the off-road machine.

Example 5 is the machine control system of any or all previous examples wherein the limitation enforcement system comprises:

a speed limitation system configured to control a propulsion control subsystem to limit a ground speed of the off-road machine.

Example 6 is the machine control system of any or all previous examples wherein the limitation enforcement system comprises:

a heading limitation system configured to control a steering control subsystem to limit a heading of the off-road machine.

Example 7 is the machine control system of any or all previous examples wherein the limitation enforcement system comprises:

a turn angle limitation system configured to control a steering control subsystem to limit a steering angle of the off-road machine.

Example 8 is the machine control system of any or all previous examples wherein the off-road machine comprises a towing vehicle and a towed implement and wherein the limitation enforcement system comprises:

an implement control signal generator configured to control steering of the towed implement.

Example 9 is the machine control system of any or all previous examples wherein the off-road machine comprises a towing vehicle and a towed implement and wherein the equipment collision point identifier is configured to identify a plurality of collision points on the towing vehicle and a plurality of collision points on the towed implement.

Example 10 is the machine control system of any or all previous examples wherein the digital fence generation system comprises:

a boundary identifier configured to obtain boundary information indicative of a boundary of a worksite;

a tolerance generator configured to access a set of machine data corresponding to the off-road machine and identify a tolerance based on the set of machine data; and a buffer addition system configured to identify a modified boundary to include a buffer based on the boundary of the worksite and the tolerance.

Example 11 is the machine control system of any or all previous examples wherein the tolerance generator is configured to vary the tolerance based on a shape of the boundary and the set of machine data.

Example 12 is the machine control system of any or all previous examples wherein the digital fence generation system comprises:

a drivable area identifier configured to identify a drivable area indicative of where ground engaging elements of a machine previously drove over the worksite;

a passable area identifier configured to identify a passable area of the worksite based on the set of machine data indicative of an area of the worksite over which a portion of the off-road machine has traveled;

a work area identifier configured to identify a work area of the worksite based on the set of machine data indicative of an area of the worksite operated on by the off-road machine, wherein the digital fence generation system is configured to generate the digital fence based on the boundary of the worksite, the tolerance, the drivable area, the passable area, and the work area.

Example 13 is the machine control system of any or all previous examples wherein the digital fence generation system comprises:

a feature addition system configured to detect a feature within the boundary of the worksite and add a location of the feature to the digital fence.

Example 14 is a computer implemented method of controlling an off-road machine, comprising:

obtaining a digital fence indicative of a boundary;

detecting a geographic location of the off-road machine;

determining that the off-road machine is within a threshold distance of the boundary;

determining whether a collision point of the off-road machine is encroaching on the boundary and generating an encroachment signal indicative of the determination; and controlling limitation of an operating envelope of the off-road machine based on the encroachment signal.

Example 15 is the computer implemented method of any or all previous examples wherein determining whether a collision point of the off-road machine is encroaching on the boundary, comprises:

identifying a collision point on a periphery of the of the off-road machine;

projecting the collision point away from the off-road machine to a projected collision point; and determining whether the projected collision point is across the boundary.

Example 16 is the computer implemented method of any or all previous examples wherein projecting the collision point comprises:

projecting the collision point in a direction away from the off-road machine parallel to a heading of the off-road machine; and projecting the collision point in a direction away from the off-road machine transverse to a heading of the off-road machine.

Example 17 is the computer implemented method of any or all previous examples wherein controlling limitation comprises at least one of:

controlling a propulsion control subsystem to limit a ground speed of the off-road machine;

controlling a steering subsystem to limit a heading of the off-road machine; or controlling a steering subsystem to limit a steering angle of the off-road machine.

Example 18 is the computer implemented method of any or all previous examples wherein the off-road machine comprises a towing vehicle and a towed implement and further comprising:

identifying a plurality of collision points on the towing vehicle and a plurality of collision points on the towed implement and wherein controlling limitation comprises controlling steering of the towed implement.

Example 19 is the computer implemented method of any or all previous examples wherein obtaining a digital fence comprises:

obtaining boundary information indicative of a boundary of a worksite;

accessing a set of machine data corresponding to the off-road machine;

identifying a tolerance based on the set of machine data;

identifying a drivable area indicative of where ground engaging elements of a machine previously drove over the worksite;

identifying a passable area of the worksite based on the set of machine data indicative of an area of the worksite over which a portion of the off-road machine has traveled;

identifying a work area of the worksite based on the set of machine data indicative of an area of the worksite operated on by the off-road machine; and generating the digital fence based on the boundary of the worksite, the tolerance, the drivable area, the passable area, and the work area.

Example 20 is a machine control system, comprising:

at least one processor;

a data store storing computer executable instructions which, when executed by the at least one processor, causes the at least one processor to perform a method, comprising:

obtaining a digital fence indicative of a boundary;

detecting a geographic location of the off-road machine;

determining that the off-road machine is within a threshold distance of the boundary;

determining whether a collision point of the off-road machine is encroaching on the boundary and generating an encroachment signal indicative of the determination; and controlling limitation of an operating envelope of the off-road machine based on the encroachment signal.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A machine control system, comprising:
    a digital fence generation system that obtains a digital fence indicative of a boundary of a worksite on which an off-road machine operates;
    a geographic location system that detects a geographic location of the off-road machine;
    a threshold distance comparison system that determines that the off-road machine is within a threshold distance of the boundary;
    a boundary crossing detector that determines whether a collision point of the off-road machine is encroaching on the boundary and generates an encroachment signal indicative of the determination; and
    a limitation enforcement system that controls limitation of an operating envelope of the off-road machine based on the encroachment signal.

2. The machine control system of claim 1 and further comprising:
    an equipment collision point identifier configured to identify a collision point on a periphery of the of the off-road machine;
    a collision point projection system configured to project the collision point away from the off-road machine to a projected collision point, wherein the boundary crossing detector is configured to determine whether the projected collision point is across the boundary.

3. The machine control system of claim 2 wherein the collision point projection system comprises:
    a forward projection system configured to project the collision point in a direction away from the off-road machine parallel to a course or bearing of the off-road machine.

4. The machine control system of claim 2 wherein the collision point projection system comprises:
    a transverse projection system projecting the collision point in a direction away from the off-road machine transverse to a bearing of the off-road machine.

5. The machine control system of claim 1 wherein the limitation enforcement system comprises:
    a speed limitation system configured to control a propulsion control subsystem to limit a ground speed of the off-road machine.

6. The machine control system of claim 1 wherein the limitation enforcement system comprises:
    a heading limitation system configured to control a steering control subsystem to limit a heading of the off-road machine.

7. The machine control system of claim 1 wherein the limitation enforcement system comprises:
    a turn angle limitation system configured to control a steering control subsystem to limit a steering angle of the off-road machine.

8. The machine control system of claim 1 wherein the off-road machine comprises a towing vehicle and a towed implement and wherein the limitation enforcement system comprises:
    an implement control signal generator configured to control steering of the towed implement.

9. The machine control system of claim 2 wherein the off-road machine comprises a towing vehicle and a towed implement and wherein the equipment collision point identifier is configured to identify a plurality of collision points on the towing vehicle and a plurality of collision points on the towed implement.

10. The machine control system of claim 1 wherein the digital fence generation system comprises:
    a boundary identifier configured to obtain boundary information indicative of a boundary of a worksite;
    a tolerance generator configured to access a set of machine data corresponding to the off-road machine and identify a tolerance based on the set of machine data; and
    a buffer addition system configured to identify a modified boundary to include a buffer based on the boundary of the worksite and the tolerance.

11. The machine control system of claim 10 wherein the tolerance generator is configured to vary the tolerance based on a shape of the boundary and the set of machine data.

12. The machine control system of claim 10 wherein the digital fence generation system comprises:
    a drivable area identifier configured to identify a drivable area indicative of where ground engaging elements of a machine previously drove over the worksite;
    a passable area identifier configured to identify a passable area of the worksite based on the set of machine data indicative of an area of the worksite over which a portion of the off-road machine has traveled;
    a work area identifier configured to identify a work area of the worksite based on the set of machine data indicative of an area of the worksite operated on by the off-road machine, wherein the digital fence generation system is configured to generate the digital fence based on the boundary of the worksite, the tolerance, the drivable area, the passable area, and the work area.

13. The machine control system of claim 10 wherein the digital fence generation system comprises:
a feature addition system configured to detect a feature within the boundary of the worksite and add a location of the feature to the digital fence.

14. A computer implemented method of controlling an off-road machine, comprising:
obtaining a digital fence indicative of a boundary;
detecting a geographic location of the off-road machine;
determining that the off-road machine is within a threshold distance of the boundary;
determining whether a collision point of the off-road machine is encroaching on the boundary and generating an encroachment signal indicative of the determination; and
controlling limitation of an operating envelope of the off-road machine based on the encroachment signal.

15. The computer implemented method of claim 14 wherein determining whether a collision point of the off-road machine is encroaching on the boundary, comprises:
identifying a collision point on a periphery of the of the off-road machine;
projecting the collision point away from the off-road machine to a projected collision point; and
determining whether the projected collision point is across the boundary.

16. The computer implemented method of claim 15 wherein projecting the collision point comprises:
projecting the collision point in a direction away from the off-road machine parallel to a heading of the off-road machine; and
projecting the collision point in a direction away from the off-road machine transverse to a heading of the off-road machine.

17. The computer implemented method of claim 14 wherein controlling limitation comprises at least one of:
controlling a propulsion control subsystem to limit a ground speed of the off-road machine;
controlling a steering subsystem to limit a heading of the off-road machine; or
controlling a steering subsystem to limit a steering angle of the off-road machine.

18. The computer implemented method of claim 14 wherein the off-road machine comprises a towing vehicle and a towed implement and further comprising:
identifying a plurality of collision points on the towing vehicle and a plurality of collision points on the towed implement and wherein controlling limitation comprises controlling steering of the towed implement.

19. The computer implemented method of claim 14 wherein obtaining a digital fence comprises:
obtaining boundary information indicative of a boundary of a worksite;
accessing a set of machine data corresponding to the off-road machine;
identifying a tolerance based on the set of machine data;
identifying a drivable area indicative of where ground engaging elements of a machine previously drove over the worksite;
identifying a passable area of the worksite based on the set of machine data indicative of an area of the worksite over which a portion of the off-road machine has traveled;
identifying a work area of the worksite based on the set of machine data indicative of an area of the worksite operated on by the off-road machine; and
generating the digital fence based on the boundary of the worksite, the tolerance, the drivable area, the passable area, and the work area.

20. A machine control system, comprising:
at least one processor;
a data store storing computer executable instructions which, when executed by the at least one processor, causes the at least one processor to perform a method, comprising:
obtaining a digital fence indicative of a boundary;
detecting a geographic location of the off-road machine;
determining that the off-road machine is within a threshold distance of the boundary;
determining whether a collision point of the off-road machine is encroaching on the boundary and generating an encroachment signal indicative of the determination; and
controlling limitation of an operating envelope of the off-road machine based on the encroachment signal.

* * * * *